US012587017B2

(12) United States Patent
Li et al.

(10) Patent No.: US 12,587,017 B2
(45) Date of Patent: Mar. 24, 2026

(54) METHODS AND APPARATUS FOR CONTROLLING AN INVERTER

(71) Applicant: UNIVERSITY OF TENNESSEE RESEARCH FOUNDATION, Knoxville, TN (US)

(72) Inventors: Fangxing Li, Knoxville, TN (US); Buxin She, Knoxville, TN (US); Jinning Wang, Knoxville, TN (US); Hantao Cui, Stillwater, OK (US); Rui Bo, Rolla, MO (US)

(73) Assignees: University of Tennessee Research Foundation; Oklahoma State University; The Curators of the University of Missouri

( * ) Notice: Subject to any disclaimer, the term of this patent is extended or adjusted under 35 U.S.C. 154(b) by 0 days.

(21) Appl. No.: 18/745,558

(22) Filed: Jun. 17, 2024

(65) Prior Publication Data

US 2024/0421599 A1     Dec. 19, 2024

Related U.S. Application Data

(60) Provisional application No. 63/521,554, filed on Jun. 16, 2023.

(51) Int. Cl.
*H02J 3/38*        (2006.01)
*H02J 3/388*       (2026.01)

(52) U.S. Cl.
CPC ................. *H02J 3/38* (2013.01); *H02J 3/388* (2020.01)

(58) Field of Classification Search
None
See application file for complete search history.

(56) References Cited

U.S. PATENT DOCUMENTS 9,853,571 B2 * 12/2017 Liu .......................... H02M 1/42
9,964,978 B2 * 5/2018 Holveck ................. G05F 1/625
(Continued)

OTHER PUBLICATIONS

A. Gkountaras, S. Dieckerhoff, and T. Sezi, "Evaluation of current limiting methods for grid forming inverters in medium voltage microgrids," in 2015 IEEE Energy Conversion Congress and Exposition (ECCE), Montreal, QC, Canada, Sep. 2015, pp. 1223-1230. doi: 10.1109/ECCE.2015.7309831. Abstract only.
(Continued)

*Primary Examiner* — Thomas J. Hiltunen
(74) *Attorney, Agent, or Firm* — FisherBroyles, LLP; Jason M. Pass; James Pohl

(57) ABSTRACT

In examples, provided are decentralized control methods and apparatus for controlling an output of an inverter. Also provided are decentralized control methods and apparatus for controlling demand in islanded microgrids operating with an insufficient distributed energy resource system (DER) power supply. The provided control methods and apparatus can include a power regulator and a voltage-frequency regulator configured to generate supplementary inputs to control the inverter. The power regulator can control an output of the inverter according to a real-time capacity constraint of the DER. The voltage-frequency regulator can control the output of the inverter in a manner that mitigates a voltage-frequency deviation, such as by leveraging load sensitivity.

18 Claims, 33 Drawing Sheets
(29 of 33 Drawing Sheet(s) Filed in Color)

100

(56) References Cited

U.S. PATENT DOCUMENTS

| | | | | |
|---|---|---|---|---|
| 11,409,316 | B2* | 8/2022 | Knobloch | H02J 3/16 |
| 2019/0190276 | A1* | 6/2019 | Liu | H02J 3/46 |
| 2024/0022082 | A1* | 1/2024 | Dong | H02J 3/32 |
| 2024/0047969 | A1* | 2/2024 | Chen | H02J 3/388 |
| 2024/0275175 | A1* | 8/2024 | Ren | H02M 3/155 |

OTHER PUBLICATIONS

A. Vasilakis, I. Zafeiratou, D. T. Lagos, and N. D. Hatziargyriou, "The Evolution of Research in Microgrids Control," IEEE Open Access Journal of Power and Energy, vol. 7, pp. 331-343, 2020, doi: 10.1109/OAJPE.2020.3030348.

B. Pawar, E. I. Batzelis, S. Chakrabarti, and B. C. Pal, "Grid-Forming Control for Solar PV Systems With Power Reserves," IEEE Transactions on Sustainable Energy, vol. 12, No. 4, pp. 1947-1959, 2021, doi: 10.1109/TSTE.2021.3074066.

B. She, F. Li, H. Cui, J. Zhang, and R. Bo, "Fusion of Microgrid Control with Model-free Reinforcement Learning: Review and Vision," IEEE Transactions on Smart Grid, Early Access, 2022, doi: 10.1109/TSG.2022.3222323.

C. Sun, G. Joos, and F. Bouffard, "Adaptive Coordination for Power and SoC Limiting Control of Energy Storage in an Islanded AC Microgrid With Impact Load," IEEE Transactions on Power Delivery, vol. 35, No. 2, pp. 580-591, Apr. 2020, doi: 10.1109/TPWRD.2019.2916034. Abstract only.

C. Wang, Z. Wang, J. Wang, and D. Zhao, "Robust Time-Varying Parameter Identification for Composite Load Modeling," IEEE Transactions on Smart Grid, vol. 10, No. 1, pp. 967-979, 2019, doi: 10.1109/TSG.2017.2756898. Abstract only.

D. K. Dheer, Y. Gupta, and S. Doolla, "A Self-Adjusting Droop Control Strategy to Improve Reactive Power Sharing in Islanded Microgrid," IEEE Transactions on Sustainable Energy, vol. 11, No. 3, pp. 1624-1635, Jul. 2020, doi: 10.1109/TSTE.2019.2933144. Abstract only.

E. S. N. Raju P. and T. Jain, "A Two-Level Hierarchical Controller to Enhance Stability and Dynamic Performance of Islanded Inverter-Based Microgrids With Static and Dynamic Loads," IEEE Transactions on Industrial Informatics, vol. 15, No. 5, pp. 2786-2797, 2019, doi: 10.1109/TII.2018.2869983. Abstract only.

F. Milano, Power System Modelling and Scripting, vol. 0. Berlin, Heidelberg: Springer Berlin Heidelberg, 2010. doi: 10.1007/978-3-642-13669-6. https://www.google.com/books/edition/Power_System_Modelling_and_Scripting/MQu7lqoLrfYC?hl=en&gbpv=1&dq=Power%20System%20Modelling%20and%20Scripting&pg=PR28&printsec=frontcover.

J. Chen, D. Yue, C. Dou, L. Chen, S. Weng, and Y. Li, "A Virtual Complex Impedance Based P Droop Method for Parallel-Connected Inverters in Low-Voltage AC Microgrids," IEEE Transactions on Industrial Informatics, vol. 17, No. 3, pp. 1763-1773, Mar. 2021, doi: 10.1109/TII.2020.2997054. Abstract only.

M. Cui, M. Khodayar, C. Chen, X. Wang, Y. Zhang, and M. E. Khodayar, "Deep Learning-Based Time-Varying Parameter Identification for System-Wide Load Modeling," IEEE Trans. Smart Grid, vol. 10, No. 6, pp. 6102-6114, Nov. 2019, doi: 10.1109/TSG.2019.2896493. Abstract only.

M. Farrokhabadi et al., "Microgrid Stability Definitions, Analysis, and Examples," IEEE Trans. Power Syst., vol. 35, No. 1, pp. 13-29, Jan. 2020, doi: 10.1109/TPWRS.2019.2925703.

M. Langwasser, G. De Carne, M. Liserre, and M. Biskoping, "Voltage-Based Load Control for Frequency Support Provision by HVDC Systems," in IECON 2018—44th Annual Conference of the IEEE Industrial Electronics Society, Oct. 2018, pp. 311-316. doi: 10.1109/IECON.2018.8592709.

M. M. Bijaieh, W. W. Weaver, and R. D. Robinett, "Energy Storage Requirements for Inverter-Based Microgrids Under Droop Control in d-q Coordinates," IEEE Transactions on Energy Conversion, vol. 35, No. 2, pp. 611-620, Jun. 2020, doi: 10.1109/TEC.2019.2959189. Abstract only.

M. N. Ahmed, M. Hojabri, A. M. Humada, H. B. Daniyal, and H. Fahad, "An Overview on Microgrid Control Strategies," vol. 4, No. 5, p. 6.

N. Bottrell and T. C. Green, "Comparison of Current-Limiting Strategies During Fault Ride-Through of Inverters to Prevent Latch-Up and Wind-Up," IEEE Trans. Power Electron., vol. 29, No. 7, pp. 3786-3797, Jul. 2014, doi: 10.1109/TPEL.2013.2279162.

N. Ghanbari and S. Bhattacharya, "Adaptive Droop Control Method for Suppressing Circulating Currents in DC Microgrids," IEEE Open Access Journal of Power and Energy, vol. 7, pp. 100-110, 2020, doi: 10.1109/OAJPE.2020.2974940.

O. Oboreh-Snapps, R. Bo, B. She, F. F. Li, and H. Cui, "Improving Virtual Synchronous Generator Control in Microgrids Using Fuzzy Logic Control," in 2022 IEEE/IAS Industrial and Commercial Power System Asia (I&CPS Asia), Jul. 2022, pp. 433-438. doi: 10.1109/ICPSAsia55496.2022.9949823.

P. Singh, P. Paliwal, and A. Arya, "A Review on Challenges and Techniques for Secondary Control of Microgrid," IOP Conf. Ser.: Mater. Sci. Eng., vol. 561, p. 012075, Nov. 2019, doi: 10.1088/1757-899X/561/1/012075.

P. Sun, J. Yao, Y. Zhao, X. Fang, and J. Cao, "Stability Assessment and Damping Optimization Control of Multiple Grid-connected Virtual Synchronous Generators," IEEE Transactions on Energy Conversion, pp. 1-1, 2021, doi: 10.1109/TEC.2021.3104348. Abstract only.

R. Salcedo et al., "Banshee distribution network benchmark and prototyping platform for hardware-in-the-loop integration of microgrid and device controllers," J. eng., vol. 2019, No. 8, pp. 5365-5373, Aug. 2019, doi: 10.1049/joe.2018.5174.

R.-J. Wai, Q.-Q. Zhang, and Y. Wang, "A Novel Voltage Stabilization and Power Sharing Control Method Based on Virtual Complex Impedance for an Off-Grid Microgrid," IEEE Transactions on Power Electronics, vol. 34, No. 2, pp. 1863-1880, Feb. 2019, doi: 10.1109/TPEL.2018.2831673. Abstract only.

S. Chaturvedi, D. Fulwani, and J. M. Guerrero, "Adaptive-SMC Based Output Impedance Shaping in DC Microgrids Affected by Inverter Loads," IEEE Transactions on Sustainable Energy, vol. 11, No. 4, pp. 2940-2949, 2020, doi: 10.1109/TSTE.2020.2982414.

S. I. Habibi, M. A. Sheikhi, T. Khalili, S. A. G. K. Abadi, A. Bidram, and J. M. Guerrero, "Multiagent-based Nonlinear Generalized Minimum Variance Control for Islanded AC Microgrids," IEEE Transactions on Power Systems, pp. 1-13, 2023, doi: 10.1109/TPWRS.2023.3239793.

S. Prakash, V. Nougain, and S. Mishra, "Adaptive Droop-Based Control for Active Power Sharing in Autonomous Microgrid for Improved Transient Performance," IEEE Journal of Emerging and Selected Topics in Power Electronics, vol. 9, No. 3, pp. 3010-3018, Jun. 2021, doi: 10.1109/JESTPE.2020.2988712. Abstract only.

S. Sivaranjani, E. Agarwal, V. Gupta, P. Antsaklis, and L. Xie, "Distributed Mixed Voltage Angle and Frequency Droop Control of Microgrid Interconnections With Loss of Distribution—PMU Measurements," IEEE Open Access Journal of Power and Energy, vol. 8, pp. 45-56, 2021, doi: 10.1109/OAJPE.2020.3047639.

She, Buxin, et al. "Decentralized and coordinated Vf control for islanded microgrids considering DER inadequacy and demand control." IEEE Transactions on Energy Conversion 38.3 (2023): 1868-1880.

W. Du et al., "A Comparative Study of Two Widely Used Grid-Forming Droop Controls on Microgrid Small-Signal Stability," IEEE J. Emerg. Sel. Topics Power Electron., vol. 8, No. 2, pp. 963-975, Jun. 2020, doi: 10.1109/JESTPE.2019.2942491. Abstract only.

W. Feng, Q. Shi, H. Cui, and F. Li, "Optimal power allocation strategy for black start in VSC-MTDC systems considering dynamic impacts," Electric Power Systems Research, vol. 193, p. 107023, 2021, doi: 10.1016/j.epsr.2021.107023.

X. Jiang, J. Xiao, B. She, and G. Zu, "Locating and sizing of partition flexible interconnection converter station in large urban power grids," IET Generation, Transmission Distribution, vol. 13, No. 21, pp. 4830-4841, Sep. 2019, doi: 10.1049/iet-gtd.2018.6871.

(56) References Cited

OTHER PUBLICATIONS

X. Kou et al., "Model-Based and Data-Driven HVAC Control Strategies for Residential Demand Response," IEEE Open Access Journal of Power and Energy, vol. 8, pp. 186-197, 2021, doi: 10.1109/OAJPE.2021.3075426.

Xunwei Yu and Zhenhua Jiang, "Dynamic current limiting control of voltage source inverters," in 2009 IEEE International Electric Machines and Drives Conference, Miami, FL, USA, May 2009, pp. 1664-1668. doi: 10.1109/IEMDC.2009.5075427.

Y. Gupta, K. Chatterjee, and S. Doolla, "A Simple Control Scheme for Improving Reactive Power Sharing in Islanded Microgrid," IEEE Transactions on Power Systems, vol. 35, No. 4, pp. 3158-3169, Jul. 2020, doi: 10.1109/TPWRS.2020.2970476. Abstract only.

Z. Qu, J. C.-H. Peng, H. Yang, and D. Srinivasan, "Modeling and Analysis of Inner Controls Effects on Damping and Synchronizing Torque Components in VSG-Controlled Converter," IEEE Transactions on Energy Conversion, vol. 36, No. 1, pp. 488-499, Mar. 2021, doi: 10.1109/TEC.2020.3010049. Abstract only.

* cited by examiner

450

Input: $e_f$, $e_v$

Step 1: $V$-$f$ state estimation $$state_f: \begin{cases} state_f = -1 & (e_f < 0) \\ state_f = 0 & (e_f = 0) \\ state_f = 1 & (e_f > 0) \end{cases}$$

$$state_v: \begin{cases} state_v = -1 & (e_v < 0) \\ state_v = 0 & (e_v = 0) \\ state_v = 1 & (e_v > 0) \end{cases}$$

Step 2: Trigger logic $state_f = state_v = 1$    YES

NO $state_f = state_v = 0$    NO

YES

Trigger load shedding: $e_f' = 0$, $e_v' = 0$

No trigger: $e_f' = 0$, $e_v' = 0$

Trigger power quality regulator: $e_f' = e_f$, $e_v' = e_v$

*FIG. 4B*

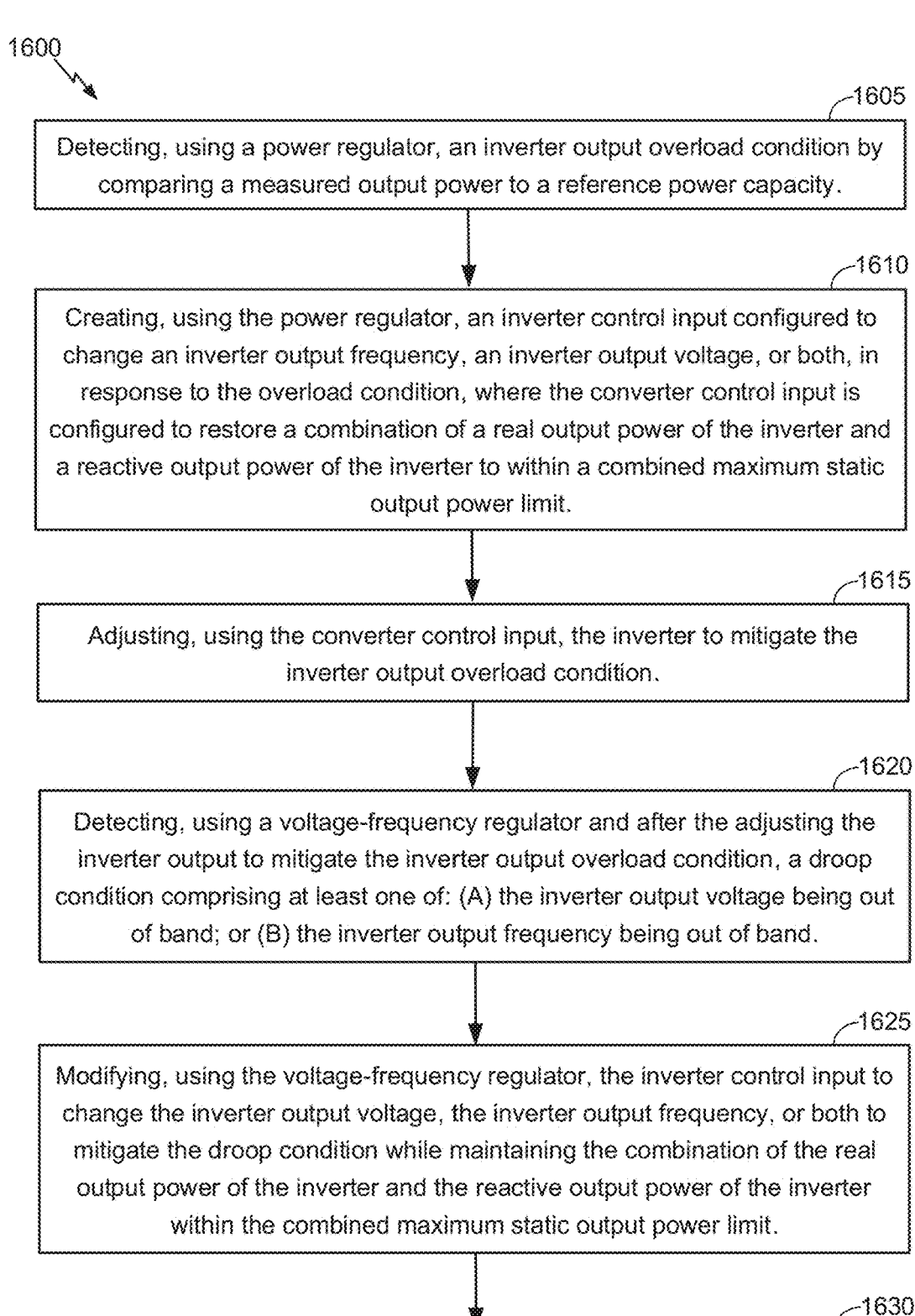

1600

1605

Detecting, using a power regulator, an inverter output overload condition by comparing a measured output power to a reference power capacity.

1610

Creating, using the power regulator, an inverter control input configured to change an inverter output frequency, an inverter output voltage, or both, in response to the overload condition, where the converter control input is configured to restore a combination of a real output power of the inverter and a reactive output power of the inverter to within a combined maximum static output power limit.

1615

Adjusting, using the converter control input, the inverter to mitigate the inverter output overload condition.

1620

Detecting, using a voltage-frequency regulator and after the adjusting the inverter output to mitigate the inverter output overload condition, a droop condition comprising at least one of: (A) the inverter output voltage being out of band; or (B) the inverter output frequency being out of band.

1625

Modifying, using the voltage-frequency regulator, the inverter control input to change the inverter output voltage, the inverter output frequency, or both to mitigate the droop condition while maintaining the combination of the real output power of the inverter and the reactive output power of the inverter within the combined maximum static output power limit.

1630

Adjusting, using the modified inverter control input, the inverter to mitigate the droop condition.

*FIG. 16*

METHODS AND APPARATUS FOR CONTROLLING AN INVERTER

CROSS-REFERENCE TO RELATED APPLICATION

This application claims the benefits of U.S. Provisional Patent Application No. 63/521,554, titled "METHODS & SYSTEMS FOR VOLTAGE & FREQUENCY (V-f) CONTROL FOR ISLANDED MICROGRIDS", filed Jun. 16, 2023, the disclosure of which is hereby incorporated herein by reference in its entirety.

STATEMENT REGARDING FEDERALLY SPONSORED RESEARCH

This invention was made with United States Government support under Grant No. EW20-5331 awarded by the United States Department of Defense (DoD). The United States Government has certain rights in the invention.

FIELD OF DISCLOSURE

This disclosure relates generally to the technical field of electronics and more specifically, but not exclusively, to islanded microgrids, distributed energy resources, inverters, power regulators, and voltage-frequency regulators, as well as methods for controlling islanded microgrids, distributed energy resources, inverters, power regulators, and voltage-frequency regulators.

BACKGROUND

In recent years, there has been increasing demand for electrical generation and storage that is performed Distributed Energy Resources (DERs). However, insufficient DER supply capacity creates challenges that include improper load sharing, direct current (DC) side instability, and large voltage and frequency (V-f) deviation, which can lead to unnecessary load shedding.

Accordingly, there are previously unaddressed and long-felt industry needs for methods and apparatus which improve upon conventional methods and apparatus.

SUMMARY

As will be described in greater detail below, the instant disclosure describes various systems and methods for controlling an inverter. In an example, the inverter can be a part of a Distributed Energy Resource (DER) system, an islanded microgrid, or both. In an example, the inverter can be a grid-forming inverter.

In examples, provided is a method for controlling an inverter. At least a portion of the method can be performed by a controller. The method can include: (i) detecting, using a power regulator, an inverter output overload condition by comparing a measured output power to a reference power capacity; (ii) creating, using the power regulator, an inverter control input configured to change an inverter output frequency, an inverter output voltage, or both, in response to the overload condition, where the converter control input is configured to restore a combination of a real output power of the inverter and a reactive output power of the inverter to within a combined maximum static output power limit; (iii) adjusting, using the converter control input, the inverter to mitigate the inverter output overload condition; (iv) detecting, using a voltage-frequency regulator and after the adjusting the inverter output to mitigate the inverter output overload condition, a droop condition comprising at least one of: (A) the inverter output voltage being out of band; or (B) the inverter output frequency being out of band; (v) modifying, using the voltage-frequency regulator, the inverter control input to change the inverter output voltage, the inverter output frequency, or both to mitigate the droop condition while maintaining the combination of the real output power of the inverter and the reactive output power of the inverter within the combined maximum static output power limit; and (vi) adjusting, using the modified inverter control input, the inverter to mitigate the droop condition.

In examples, the inverter can be a grid-forming inverter connected to a distributed energy resource system.

In examples, the detecting the inverter output overload condition can further include detecting, in an absence of a change of the inverter control input, a decrease in the inverter output voltage, a decrease in the inverter output frequency, or both.

In examples, the creating the inverter control input can further include calculating, when the real-time reference capacity is equal to or less than the measured output power, a supply error by subtracting the measured output power from the real-time reference capacity.

In examples, the modifying the inverter control input can further include: (i) calculating a frequency error by: (A) calculating a differential frequency by subtracting the inverter output frequency from a reference output frequency; and (B) comparing the differential frequency to a maximum differential output frequency; (ii) calculating a voltage error by: (A) calculating a differential voltage by subtracting the inverter output voltage from a reference output voltage; and (B) comparing the differential voltage to a maximum differential output voltage; (iii) applying the frequency error and the voltage error to respective proportional integral controllers; and (iv) using the output of the respective proportional integral controllers to modify the inverter control input.

In examples, the method can further include applying the frequency error and the voltage error to trigger logic, where the trigger logic that is configured to trigger power quality regulation when either: (i) the inverter output voltage is out of band; or (ii) the inverter output frequency is out of band.

In examples, the method can further include triggering load shedding when both the inverter output voltage is out of band and the inverter output frequency is out of band simultaneously.

In examples, provided is an inverter control system. In examples, the inverter control system can include: (i) a power regulator configured to: (A) detect an inverter output overload condition by comparing a measured output power to a reference power capacity; (B) create an inverter control input configured to change an inverter output frequency, an inverter output voltage, or both, in response to the overload condition, where the converter control input is configured to restore a combination of a real output power of the inverter and a reactive output power of the inverter to within a combined maximum static output power limit; and (C) adjust, using the converter control input, an inverter to mitigate the inverter output overload condition; and (ii) a voltage-frequency regulator configured to: (A) detect, after the adjusting the inverter output to mitigate the inverter output overload condition, a droop condition comprising at least one of: (I) the inverter output voltage being out of band; or (II) the inverter output frequency being out of band; (B) modify the inverter control input to change the inverter output voltage, the inverter output frequency, or both to mitigate the droop condition while maintaining the combination of the real output power of the inverter and the reactive output power of the inverter within the combined maximum static output power limit; and (C) adjust, using the modified inverter control input, the inverter to mitigate the droop condition.

In examples, the inverter control system can further include the inverter, where the inverter is a grid-forming inverter connected to a distributed energy resource system.

In examples, the detecting the inverter output overload condition can further include detecting, in an absence of a change of the inverter control input, a decrease in the inverter output voltage, a decrease in the inverter output frequency, or both.

In examples, the creating the inverter control input can further include calculating, when the real-time reference capacity is equal to or less than the measured output power, a supply error by subtracting the measured output power from the real-time reference capacity.

In examples, the modifying the inverter control input can further include: (i) calculating a frequency error by: (A) calculating a differential frequency by subtracting the inverter output frequency from a reference output frequency; and (B) comparing the differential frequency to a maximum differential output frequency; (ii) calculating a voltage error by: (A) calculating a differential voltage by subtracting the inverter output voltage from a reference output voltage; and (B) comparing the differential voltage to a maximum differential output voltage; (iii) applying the frequency error and the voltage error to respective proportional integral controllers; and (iv) using the output of the respective proportional integral controllers to modify the inverter control input.

In examples, the voltage-frequency regulator can be further configured to apply the frequency error and the voltage error to trigger logic that is configured to trigger power quality regulation when either: (i) the inverter output voltage is out of band; or (ii) the inverter output frequency is out of band.

In examples, the voltage-frequency regulator can be further configured to trigger load shedding when both the inverter output voltage is out of band and the inverter output frequency is out of band simultaneously.

In examples, provided is a non-transitory computer-readable medium storing one or more computer-executable instructions that, when executed by at least one processor of a computing device, cause the computing device to perform a method for controlling an inverter. The method for controlling the inverter can include: (i) detecting, using a power regulator, an inverter output overload condition by comparing a measured output power to a reference power capacity; (ii) creating, using the power regulator, an inverter control input configured to change an inverter output frequency, an inverter output voltage, or both, in response to the overload condition, where the converter control input is configured to restore a combination of a real output power of the inverter and a reactive output power of the inverter to within a combined maximum static output power limit; (iii) adjusting, using the converter control input, the inverter to mitigate the inverter output overload condition; (iv) detecting, using a voltage-frequency regulator and after the adjusting the inverter output to mitigate the inverter output overload condition, a droop condition comprising at least one of: (A) the inverter output voltage being out of band; or (B) the inverter output frequency being out of band; (v) modifying, using the voltage-frequency regulator, the inverter control input to change the inverter output voltage, the inverter output frequency, or both to mitigate the droop condition while maintaining the combination of the real output power of the inverter and the reactive output power of the inverter within the combined maximum static output power limit; and (vi) adjusting, using the modified inverter control input, the inverter to mitigate the droop condition.

In examples, the inverter can be a grid-forming inverter connected to a distributed energy resource system.

In examples, the detecting the inverter output overload condition can further include detecting, in an absence of a change of the inverter control input, a decrease in the inverter output voltage, a decrease in the inverter output frequency, or both.

In examples, the creating the inverter control input can further include calculating, when the real-time reference capacity is equal to or less than the measured output power, a supply error by subtracting the measured output power from the real-time reference capacity.

In examples, the modifying the inverter control input can further include: (i) calculating a frequency error by: (A) calculating a differential frequency by subtracting the inverter output frequency from a reference output frequency; and (B) comparing the differential frequency to a maximum differential output frequency; (ii) calculating a voltage error by: (A) calculating a differential voltage by subtracting the inverter output voltage from a reference output voltage; and (B) comparing the differential voltage to a maximum differential output voltage; (iii) applying the frequency error and the voltage error to respective proportional integral controllers; and (iv) using the output of the respective proportional integral controllers to modify the inverter control input.

In examples, the method can further include applying the frequency error and the voltage error to trigger logic, where the trigger logic that is configured to trigger power quality regulation when either: (i) the inverter output voltage is out of band; or (ii) the inverter output frequency is out of band.

In examples, the method can further include triggering load shedding when both the inverter output voltage is out of band and the inverter output frequency is out of band simultaneously.

BRIEF DESCRIPTION OF THE DRAWINGS

The accompanying drawings are presented to describe examples of the present teachings and are not limiting. Together with this following description, the drawings demonstrate and explain various principles of the present disclosure. The patent or application file contains at least one drawing executed in color. Copies of this patent or patent application publication with color drawing(s) will be provided by the Office upon request and payment of the necessary fee.

FIG. 4B depicts example trigger logic of a V-f regulator suitable for implementing examples of the disclosed subject matter.

FIG. 16 depicts an example method for controlling an inverter suitable for implementing examples of the disclosed subject matter.

FIGS. 1-16, and text descriptions thereof, are nonlimiting.

Figure 1:
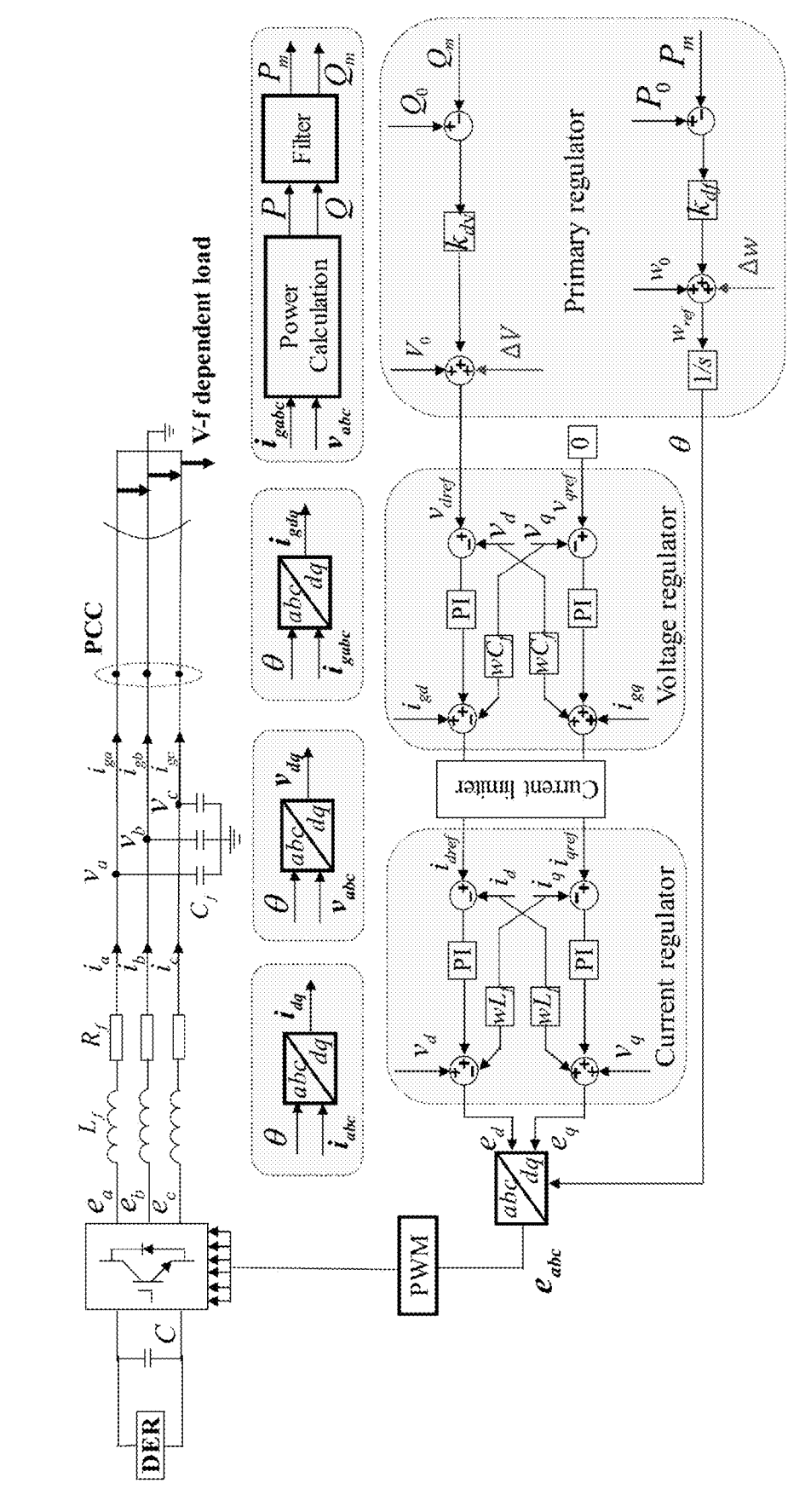
FIG. 1 depicts an example droop-controlled grid-forming (GFM) inverter supplying a voltage and frequency (V-f) dependent load.

Each of the drawings is provided for illustration and description only and does not limit the present disclosure. In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

I. Introduction

To address the previously unaddressed and long-felt industry needs for methods and apparatus that improve upon conventional methods and apparatus, provided are novel example methods and apparatuses that can control islanded microgrids, distributed energy resources (DERs), inverters, power regulators, voltage-frequency regulators, circuit breakers, power management devices, and other power grid devices.

In nonlimiting examples, DERs can be electrical power systems that can include at least one device configured to generate electricity, at least one device configured to store electricity, at least one device configured to distribute electricity, or a combination thereof, as well as an associated power management device. In an example a DER can be an islanded microgrid.

In examples, provided are decentralized methods and apparatus for coordinating output of grid-forming (GFM) inverters and controlling low demand in islanded microgrids operating with an insufficient DER supply. The provided control systems and apparatus can include a power regulator and a voltage-frequency regulator configured to generate supplementary signals that can be used to control a primary controller of an inverter. The power regulator can be configured to control an output of at least one grid-forming inverter according to a real-time capacity constraint of at least one DER. The voltage-frequency regulator can be configured to control the output of the at least one grid-forming inverter in a manner that mitigates a voltage-frequency deviation (e.g. by leveraging load sensitivity).

A typical microgrid can be composed of multiple distributed energy resources (DERs), energy storage systems, and local loads, which can operate in either grid-connected mode or islanded mode. Compared with a conventional bulk power system, microgrids have the characteristics of more DERs, smaller system size, higher uncertainty, lower system inertia, and stronger voltage and frequency (V-f) coupling. All these features create challenges for load-generation balance and V-f regulation in microgrids, especially in islanded microgrids that are not supported by the main grid.

A hierarchical control framework, which can include the primary controller, secondary controller, and tertiary controller, can be used in islanded microgrids. The primary controller can have a high bandwidth and can provide automatic load sharing. Due to its fast response and important power-sharing functionality, the primary control can dominantly determine the V-f deviation and stability of microgrids. Inductive microgrids can employ the P-f and Q-V droop curves in primary control, while resistive microgrids use the reverse P-V and Q-f droop curves. In this way, V-f can be maintained after normal disturbances.

An islanded microgrid can have many inverter-based generations. As a result of the high penetration of renewable energy, a major cause of grid instability and large V-f deviation pertains to the inadequacy of DERs. DER inadequacy indicates that the capacity of inverter-based generations is insufficient to supply a microgrid's total load. The impacts of limited DER capacity can be seen at both the inverter level and the grid level. For a single inverter, the DC side voltage maintained by the buck-boost converter tends to ripple first and then droop across the linked capacitor when DERs cannot supply enough power. For the whole microgrid, insufficient active and reactive power (P-Q) may result in over frequency and voltage dip. The negative impacts of insufficient DERs necessitate more efficient use of existing generation capacity, which makes the power regulation of inverter-based generations critical in islanded microgrids. The output of grid-following (GFL) inverters can be controlled easily by changing the $P_{ref}$ and $Q_{ref}$. Grid-forming (GFM) inverters, on the other hand, make it hard to control power accurately and quickly. The GFM inverters can be controlled as voltage sources, and their output can be mostly determined by the grid side performance.

The output of GFM inverters can be limited using a current limiter between the current and voltage regulator. The threshold of the current limiter can be set at 2 p.u. to 3 p.u. because the current limiter is designed to prevent high currents in abnormal conditions, e.g., the high currents in low voltage ride through after grounded faults. Apart from the current limiter, a virtual impedance can be added to the voltage control loop to limit the terminal voltage of the inverter. However, the current limiter and virtual impedance are mainly designed for protecting the hardware device and cannot accurately control the output of inverters in normal conditions. Moreover, the saturation caused by the current limiter and virtual impedance may result in the instability of the microgrids. In fact, the output of GFM inverters in islanded microgrids can be determined by the load-sharing results. Their output can be regulated by changing the power-sharing parameters, such as nominal $P_{ref}$-$Q_{ref}$ and droop gains. The droop gains can be tuned proportionally to DER capacities, allowing each DER to take on new loads according to its capacity. Considering that a DER's capacity may fluctuate from time to time due to its intermittent nature, conventional techniques are no longer effective if the overall DER capacity is insufficient. This problem is caused by the saturation of various control modules. Thus, a new GFM inverter power regulator that compensates for DER inadequacy is provided. Further, since P-Q generation can share the same apparent capacity, it can be important to enable coordination between P-Q generation while regulating the output of an inverter.

In examples, provided is a decentralized and coordinated V-f control framework to address DER inadequacy in islanded microgrids. With the provided control methods, each GFM inverter can output any power according to real-time capacity constraints, without communicating with adjacent inverters. In addition, demand control can be incorporated into this control framework to reduce load-generation mismatch when DER capacity is insufficient. Demand control can leverage load sensitivity to V-f and can minimize involuntary load shedding. Mathematical analysis and simulation results show that demand control collaborates well with inverter output regulator within the decentralized and coordinated framework. In examples, the provided systems and methods can regulate the output of each GFM inverter accurately and quickly. The provided systems and methods can also mitigate V-f deviation and reduce instances of involuntary load shedding without depending on knowledge and measurements from adjacent nodes.

In some embodiments, the provided methods and apparatus can advantageously quickly and accurately regulate an output of a GFM inverter according to real-time capacity constraints, such as without requiring information describing a status of another inverter. In examples, the provided methods and apparatus can advantageously improve voltage-frequency deviation of a microgrid. In embodiments, the provided methods and apparatus can advantageously reduce instances of involuntary load shedding. In embodiments, the provided methods and apparatus can advantageously prevent ongoing inverter output overload by performing load shedding in the presence of specific inverter output conditions.

Numerous examples are disclosed in this application's text and drawings. Alternate examples can be devised without departing from the scope of this disclosure. Additionally, conventional elements of the current teachings may not be described in detail, or may be omitted, to avoid obscuring aspects of the current teachings.

The following list of abbreviations, acronyms, and terms is provided to assist in comprehending the current disclosure and are not provided as limitations.

| Abbreviation | Definition |
| --- | --- |
| AC | Alternating Current |
| BESS | Battery Energy Storage System |
| DAE | Differential Algebraic Equation |
| DC | Direct Current |
| DER | Distributed Energy Resource |
| f | Frequency |
| GFL | Grid-Following Inverter |
| GFM | Grid-Forming Inverter |
| MVA | Mega-Volt-Amperes |
| MVar | Mega-Volt-Amperes Reactive |
| P | Active Power |
| PF | Power Factor |
| PI | Proportional-Integral |
| $P_{ref}$ | Reference Active Power |
| Q | Reactive Power |
| $Q_{ref}$ | Reference Reactive Power |
| $S_m$ | Measured Output |
| $S_r$ | Real-Time Reference Capacity |
| TDS | Time-Domain Simulation |
| V | Voltage |

II. DER Inadequacy in Islanded Microgrids

This section presents some of the challenges related to DER inadequacy in islanded microgrids and introduces the foundation of the control framework to address these challenges.

A. Configuration of Islanded Microgrids

1. Grid-Forming Inverter

FIG. 1 depicts an example distributed energy resource (DER) system 100 including a droop-controlled grid-forming (GFM) inverter supplying a voltage and frequency (V-f) dependent load. A droop-controlled GFM inverter can be a basic unit of an islanded microgrid. The GFM inverter can be controlled as a voltage source, and the control framework can include a current regulator, a voltage regulator, and a primary regulator, as shown in Equations (1)-(3). As a negative feedback controller, the purpose of the primary regulator below is to emulate the droop characteristics of conventional synchronous generators and automatically share the load among microgrid inverters.

$$\begin{bmatrix} e_d \\ e_q \end{bmatrix} = \begin{bmatrix} v_d \\ v_q \end{bmatrix} + wL_f \begin{bmatrix} -i_q \\ i_d \end{bmatrix} + \begin{bmatrix} k_{pid} + \dfrac{k_{iid}}{s} & 0 \\ 0 & k_{piq} + \dfrac{k_{iiq}}{s} \end{bmatrix} \left( \begin{bmatrix} i_{dref} \\ i_{qref} \end{bmatrix} - \begin{bmatrix} i_d \\ i_q \end{bmatrix} \right) \quad (1)$$

$$\begin{bmatrix} i_{dref} \\ i_{qref} \end{bmatrix} = \begin{bmatrix} i_{gd} \\ i_{gq} \end{bmatrix} + wC_f \begin{bmatrix} -v_q \\ v_d \end{bmatrix} + \quad (2)$$

$$\begin{bmatrix} k_{pud} + \dfrac{k_{iud}}{s} & 0 \\ 0 & k_{puq} + \dfrac{k_{iuq}}{s} \end{bmatrix} \left( \begin{bmatrix} v_{dref} \\ v_{qref} \end{bmatrix} - \begin{bmatrix} v_d \\ v_q \end{bmatrix} \right)$$

$$\begin{bmatrix} w_{ref} \\ V_{ref} \end{bmatrix} = \begin{bmatrix} k_{df} & 0 \\ 0 & k_{dv} \end{bmatrix} \left( \begin{bmatrix} P_0 \\ Q_0 \end{bmatrix} - \begin{bmatrix} P_m \\ Q_m \end{bmatrix} \right) + \begin{bmatrix} w_0 \\ V_0 \end{bmatrix} \quad (3)$$

Where $P_0$ and $Q_0$ are initial power setting points; $P_m$ and $Q_m$ are measured output; $k_{df}$ and $k_{dv}$ are frequency and voltage droop gains, respectively.

2. V-f Dependent Load

As shown in Equation (4), V-f dependent ZIP loads can be modeled.

$$\begin{cases} P_l = P_0(p_1 V_l^2 + p_2 V_l + p_3)[1 + K_{pf}(f - f_0)] \\ Q_l = Q_0(q_1 V_l^2 + q_2 V_l + q_3)[1 + K_{qf}(f - f_0)] \end{cases} \quad (4)$$

Where $V_l$ is the load side voltage; $p_1 + p_2 + p_3 = 1$ and $q_1 + q_2 + q_3 = 1$; $K_{pf}$ is the sensitivity of P/to f; $K_{qf}$ is the sensitivity of $Q_l$ to f. The acronym "ZIP" stands for the three defined load types: Z=constant impedance, I=constant current, and P=constant power.

The coefficients in Equation (4) represent the compositions of ZIP loads. They can change with the time of day and week, seasons, and weather, but can be constant in a timescale reflected at the load side, which in turn changes the system demand that depends on the load sensitivity to V-f. As a result, demand control can participate in V-f regulation in islanded microgrids.

B. DER Inadequacy and its Challenges

An islanded microgrid can be a self-sufficient system. Thus, DERs can pose great challenges to grid operation due to their intrinsic features of uncertainty and intermittency.

1. Load Condition and DER Inadequacy

Figure 2:
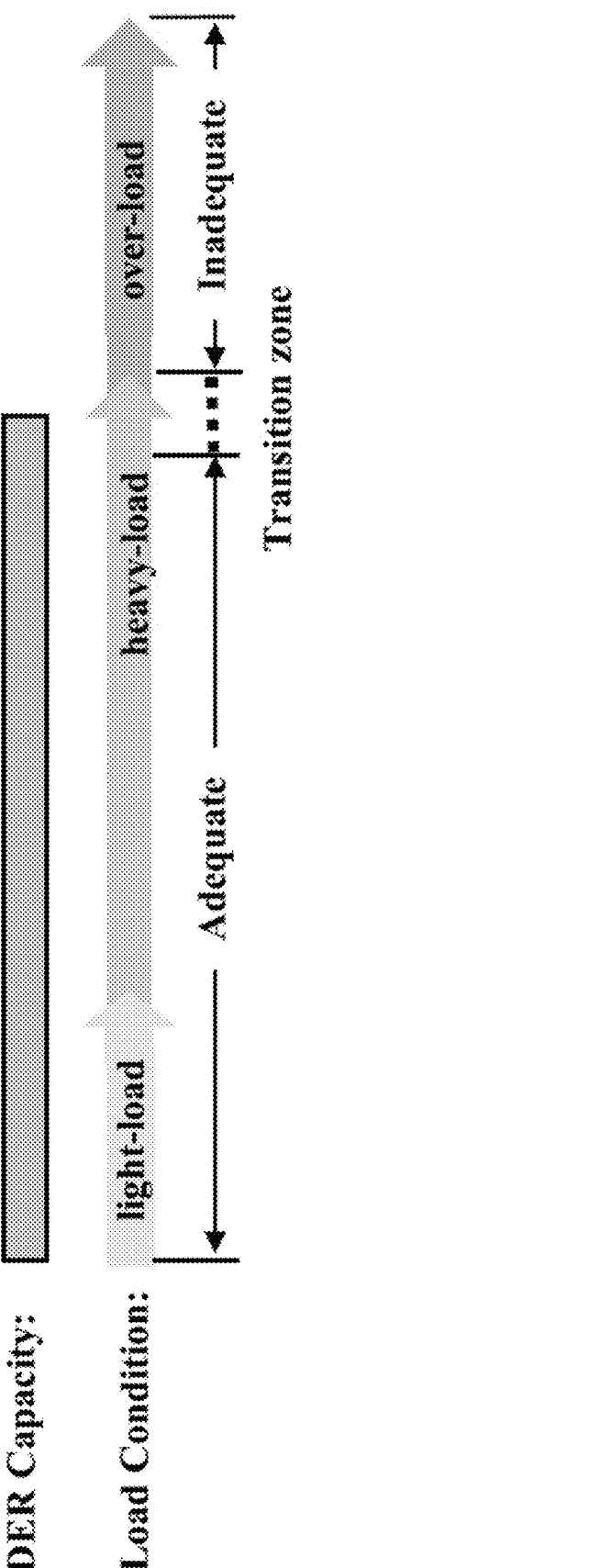
FIG. 2 depicts example distributed energy resource (DER) inadequacy under various load levels.

FIG. 2 depicts example DER inadequacy 200 under various load levels. With the DER capacity as the baseline, there are generally three load conditions, i.e., light-load, heavy-load, and over-load. In the light-load condition, the total load is much smaller than the DER capacity. Thus, grid V-f may not significantly deviate from the nominal value after normal load change. In the heavy-load condition, the total load is close to, but slightly under, the DER capacity. The output of some GFM inverters may exactly equal the capacity of the DC side source. In the over-load condition, the total load is larger than the DER capacity, such that the power balance cannot be guaranteed unless conducting load shedding.

In FIG. 2, if the total load is significantly lower than the generation capacity, the DER is adequate; if the total load is much larger than the generation capacity, the DER is inadequate. Examples, the provided techniques can provide a load-generation balance in the critical transition area between the adequate and inadequate zones merits more attention. The provided techniques can leverage this critical transition area for its potential to improve stability and reduce V-f deviation, which can be important in the background of high penetration of intermittent renewable generation and extreme weather conditions.

2. Challenges

There are several challenges in islanding microgrids when it comes to DER inadequacy, including and not limited to improper load sharing, DC side instability, and large V-f deviation.

The first challenge is related to load sharing. In the conventional droop control, the load sharing results are determined by the initial setting point $[P_0, Q_0]$ and droop gains $[k_{dp}, k_{dv}]$. The load change at an equilibrium point can be shared proportionally with the droop gains and among the microgrid inverters, which are tuned based on the DER capacity. However, due to the intermittency of DERs, their capacities can fluctuate from time to time. The GFM inverter can have a stability issue if load sharing cannot adapt to the real-time DER capacity. The challenge can be important in the transition zone shown in FIG. 2 because most GFM inverters work in critical states with little reserved capacity.

Figure 3A:
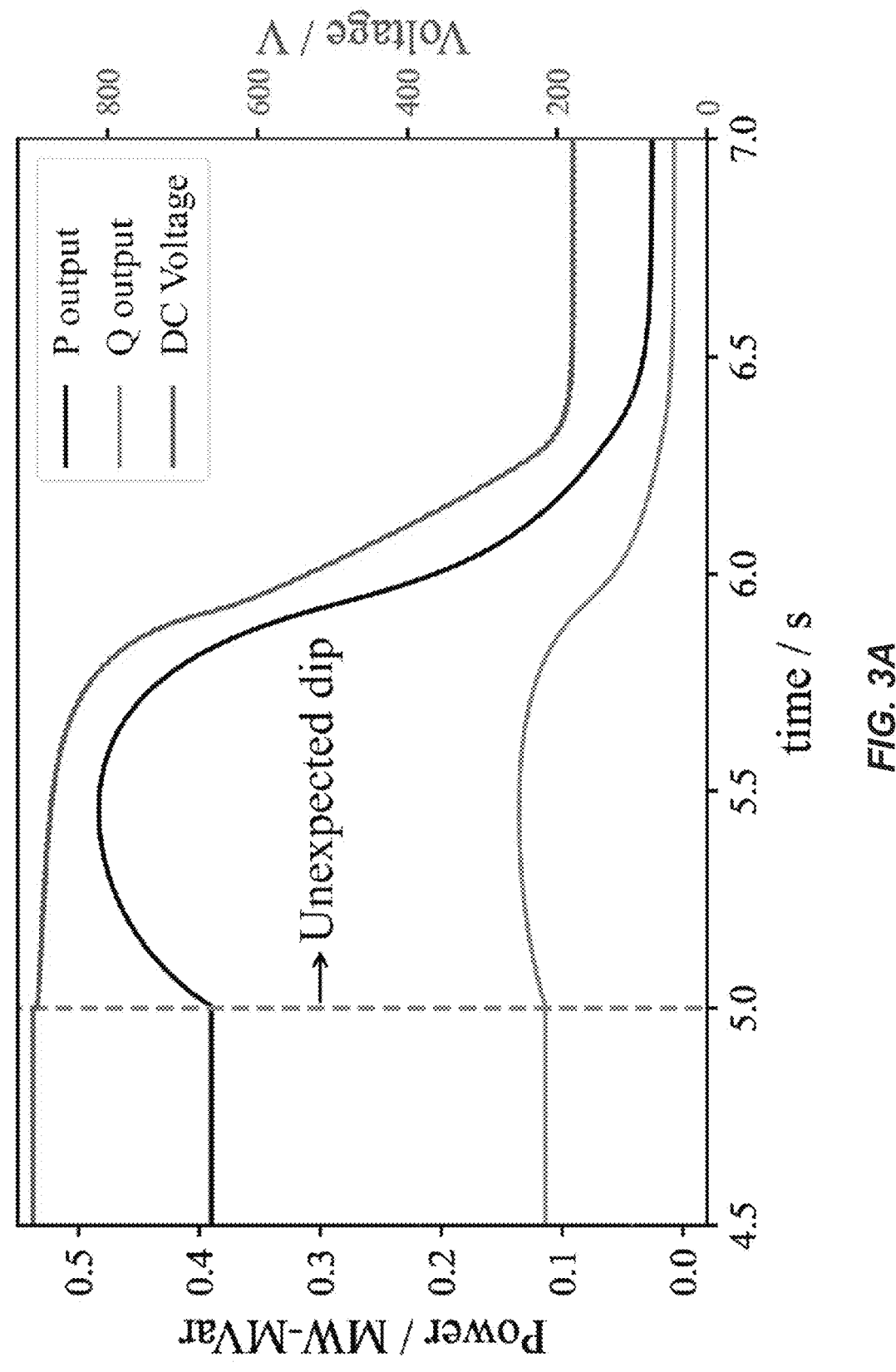
FIG. 3A depicts example direct current (DC) side voltage dip challenges related to DER inadequacy.

The second challenge stems from improper load sharing among DERs and is related to DC side voltage. When the shared loads exceed the capacity of the DC side DERs, there is insufficient energy to support the capacitor voltage, which may result in a voltage dip first and then distort Pulse-Width Modulation (PWM). Furthermore, the inverter-based generation will trip and compound the DER inadequacy. FIG. 3A depicts example DC side voltage dip challenges 300 related to DER inadequacy, such as an unexpected DC voltage dip and generation loss when the shared loads exceed the DER capacity at 5s.

Figure 3B:
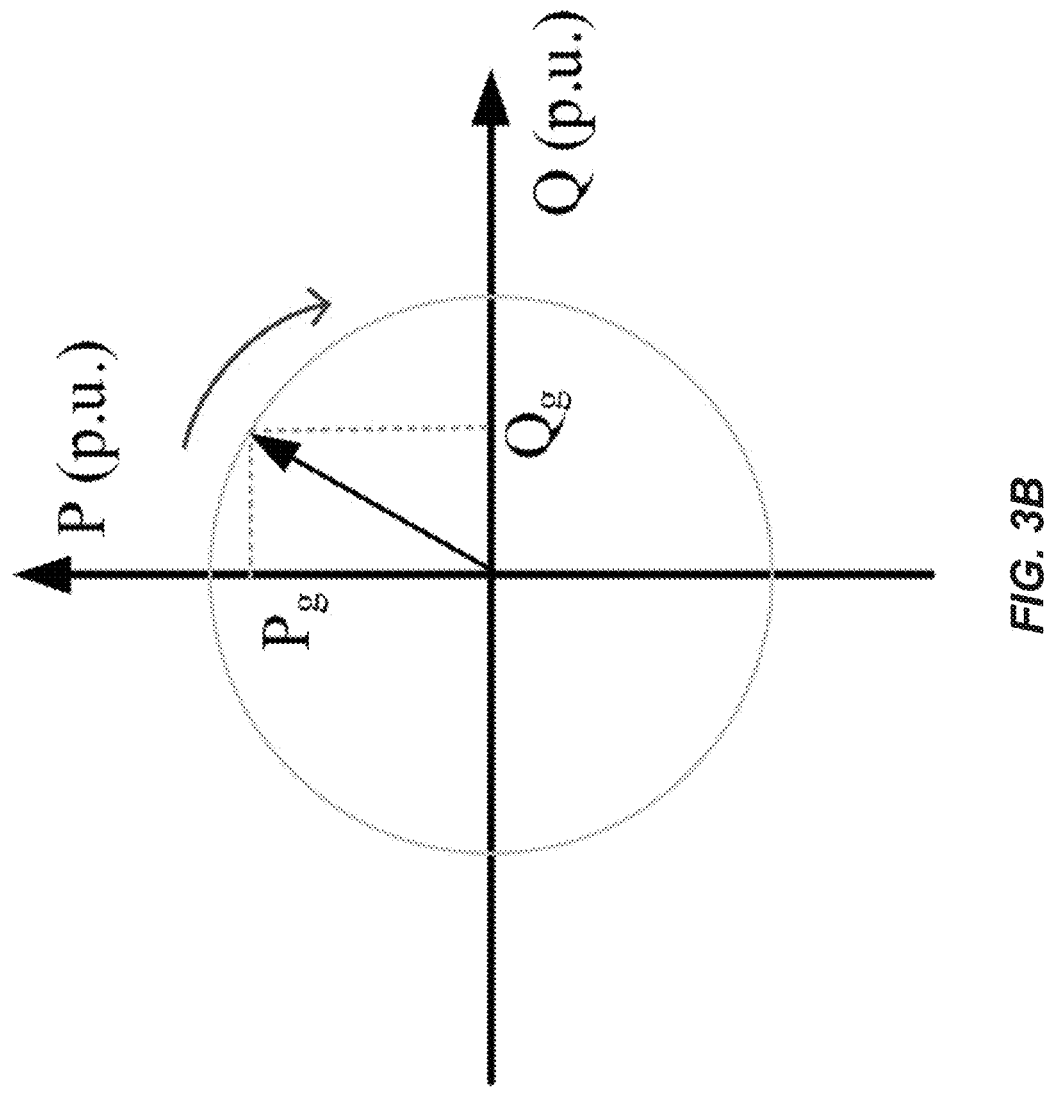
FIG. 3B depicts example constrained generation capacity for V-f regulation challenges related to DER inadequacy.
Figure 3B:
Figure 3C:
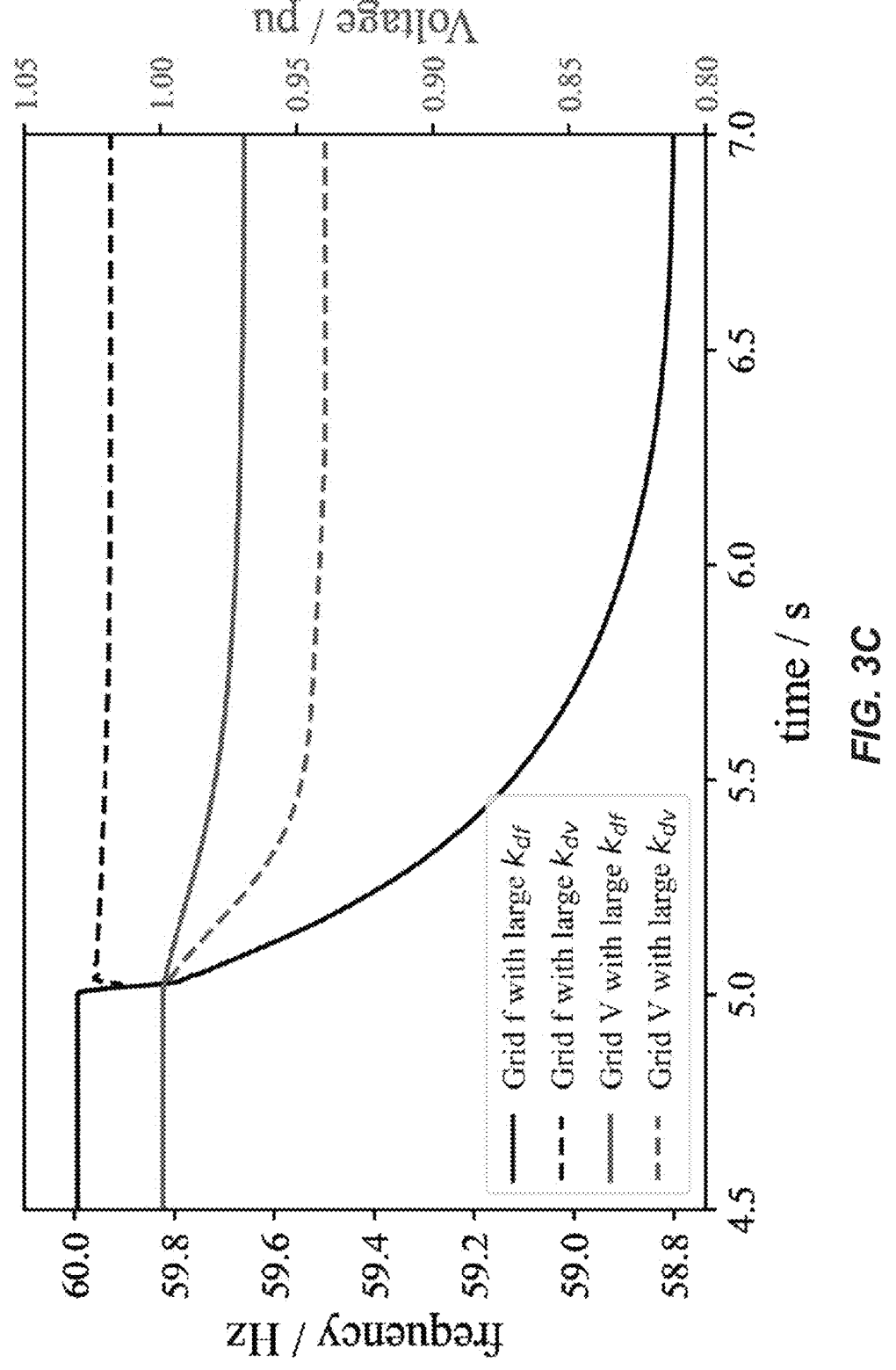
FIG. 3C depicts example unexpected V-f regulation with distinct droop gain challenges related to DER inadequacy.

The third challenge relates to large V-f deviation. The first two challenges often impact a single or several inverters, while the third challenge, which is about allocating limited generation capacity to the V-f regulation loop, impacts the whole grid. FIG. 3B depicts an example constrained generation capacity 330 for V-f regulation challenges related to DER inadequacy. FIG. 3B shows the bounded generation constraint. Following the same constraint, V-f regulation results are quite different when implementing distinct P-Q generation strategies. Under bounded generation constraints, a large $k_{df}$ yields more active power generation and less frequency dip, while a large $k_{dv}$ yields more reactive power generation and less voltage dip. FIG. 3(c) shows the unexpected V-f regulation with distinct droop gains. Usually, the deviation of frequency should be less than 0.01 p.u. and the deviation of voltage should be less than 0.05 p.u . . . . FIG. 3C depicts example unexpected V-f regulation 360 with distinct droop gain challenges related to DER inadequacy. In FIG. 3C, the requirements for V-f deviation cannot be met at the same time. The V-f deviation can be improved according to the supplementary signals generated by the conventional secondary controller. However, due to saturation caused by the capacity constraints in FIG. 3B, the inverter may fail to respond to these signals, resulting in an unexpected DC voltage dip.

Considering these challenges, there is a need for a V-f control framework that can: regulate the output of GFM inverters and improve load sharing results based on real-time DER capacity, as well as adjust P-Q generation under the condition of constrained DER capacity for both acceptable voltage and frequency deviation.

C. Foundation of the Decentralized and Coordinated V-f Control Framework

In FIG. 1, the primary control signals $w_{ref}$ and $v_{dref}$ determine the load sharing results and V-f deviation. The provided systems and methods can include a power regulator and a V-f regulator, which can generate supplementary signals for $w_{ref}$ and $v_{dref}$ based on real-time measurements. Specifically, the supplementary signal of the power regulator can be generated according to an error between real-time reference capacity $S_r$ and measured output $S_m$, which automatically re-shares the exceeding output among the other inverters. The supplementary signal of the power regulator provides the constrained generation shown in FIG. 3B. Then, like the conventional secondary control, the V-f regulator can further adjust P-Q generation along the boundary and perform load power control through V-f regulation. Finally, the provided systems and methods can regulate inverter output and improve V-f deviation at the same time.

In examples, the supplementary signals can be generated depending on local measurements. The provided systems and methods can further enable cooperation between (i) Generation and load: Generation and load power can be regulated simultaneously until reaching a new equilibrium; (ii) V regulation and f regulation:

Requirements for V-f deviation can be considered at the same time. A tradeoff can be made while allocating limited DER capacity for V-f regulation; and (iii) P generation and Q generation: Limited DER capacity can be allocated to P-loop and Q-loop properly. As a result, the provided systems and methods can be decentralized and coordinated.

III. A Decentralized and Coordinated Control Framework

Figure 4A:
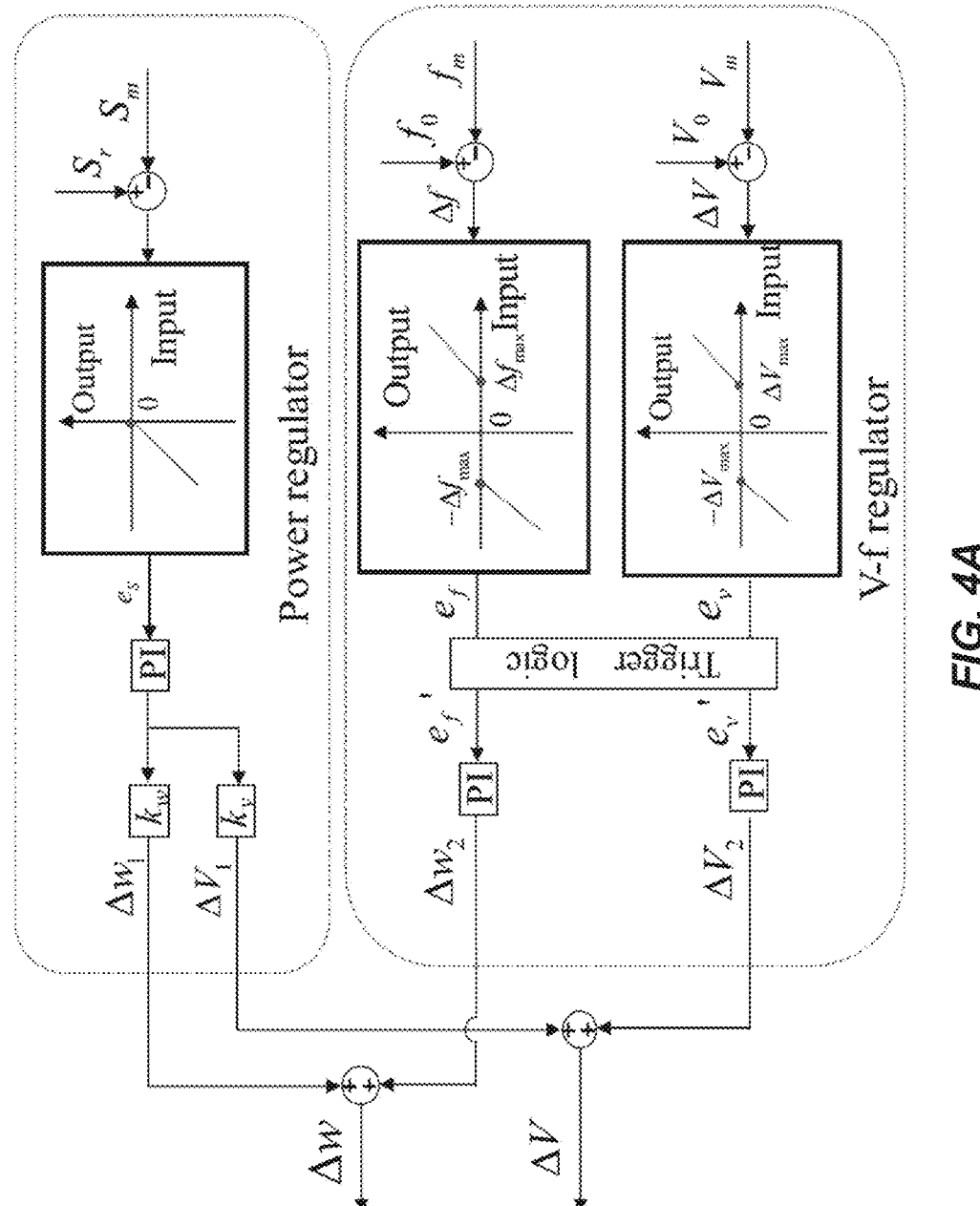
FIG. 4A depicts an example inverter control framework suitable for implementing examples of the disclosed subject matter.

This section introduces the provided decentralized and coordinated V-f control framework. FIG. 4A depicts an example inverter control framework 400 suitable for implementing examples of the disclosed subject matter. As shown in FIG. 4A, the control framework consists of a power regulator and a V-f regulator. They are implemented locally, generating supplementary signals $\Delta w'$ and $\Delta V'$ for the primary controller of each GFM inverter.

A. Power Regulator

An example transfer function of the power regulator is shown in Equations (5)-(6).

$$\begin{bmatrix} \Delta w_1 \\ \Delta V_1 \end{bmatrix} = \left( k_{ps} + \frac{k_{is}}{s} \right) e_s \begin{bmatrix} k_w \\ k_v \end{bmatrix} \tag{5}$$

$$e_s = \begin{cases} 0 & S_r > S_m \\ S_r - S_m & S_r \le S_m \end{cases} \tag{6}$$

The errors between $S_r$ and $S_m$ are fed to a proportional-integral (PI) controller, which is then allocated to the frequency and voltage regulation loop according to regulation gains $k_w$ and $k_v$, respectively. Typically, if the inverter outputs more power than $S_r$, $e_s$ is negative, and the inverter will decrease its output by decreasing the terminal voltage and angle frequency. The final decrease was determined by $e_s$ proportionally allocated to the active power loop and the reactive power loop, specifically, the proportion between $k_w$ and $k_v$. Given load sensitivity and disturbance, a larger $k_w$ means more sharing in the active power loop and more frequency dip, while a larger $k_v$ means more sharing in the active power loop and more frequency dip.

The $e_s$ allocation by the power regulator may not always be optimized due to the uncertainties from both the generation and load sides. There are no single-value, fixed $k_w$ and $k_v$ that can handle all the disturbance scenarios at the same time. Hence, provided is the V-f regulator to generate additional supplementary signals and further adjust the active power and reactive power sharing results. In practice, $k_w$ and $k_v$ can be set based on load power factor (PF), so as to match the load-side disturbance as much as possible. Specifically, if PF=cos $\vartheta$, then set $k_w/k_v$=tan $\vartheta$.

V-f Regulator The transfer function of the V-f regulator is shown in (7)-(9).

$$\begin{bmatrix} \Delta w_2 \\ \Delta V_2 \end{bmatrix} = \begin{bmatrix} k_{pf} + \frac{k_{if}}{s} & 0 \\ 0 & k_{pv} + \frac{k_{iv}}{s} \end{bmatrix} Tr \left( \begin{bmatrix} e_f \\ e_v \end{bmatrix} \right) \tag{7}$$

$$e_f = \begin{cases} \Delta f + \Delta f_{max} & \Delta f < -\Delta f_{max} \\ 0 & -\Delta f_{max} \le \Delta f \le \Delta f_{max} \\ \Delta f - \Delta f_{max} & \Delta f > \Delta f_{max} \end{cases} \tag{8}$$

$$e_v = \begin{cases} \Delta V + \Delta V_{max} & \Delta V < -\Delta V_{max} \\ 0 & -\Delta V_{max} \le \Delta V \le \Delta V_{max} \\ \Delta V - \Delta V_{max} & \Delta V > \Delta V_{max} \end{cases} \tag{9}$$

Where $\Delta_f = f_0 - f_m$, $\Delta V = V_0 - V_m$, and Tr is the trigger logic shown in FIGS. 4A and 4B.

FIG. 4B depicts example trigger logic 450 of a V-f regulator suitable for implementing examples of the disclosed subject matter. The trigger logic considers the relationship between V-f regulation and load-generation balance. In step 1, it estimates the state of V-f and determines the required capacity for V-f regulation. For example, if $e_w$>0 (state==1), more reactive power is required for frequency regulation, and frequency regulation will take up more generation capacity; in reverse, $e_w$<0 means less need of active power and frequency regulation could give up some generation capacity. This logic can also be applicable to the reactive power loop (V regulation loop). Then in step 2, the trigger logic judges whether the existing DER capacity is adequate or not to meet the V-f deviation requirements, which is categorized into the following three conditions.

The first condition is "state$_f$=state$_v$=1" means V-f droop too much at the same time, and both V-f regulation loops need more generation capacity. The existing DER capacity is not sufficient to regulate V-f, thus load shedding is needed.

The second condition is "state$_f$=state$_v$=0" means V-f deviations are within the acceptable region and no additional regulation signal is needed.

The remaining combinations of state$_f$ and state$_v$ mean that one regulation (V or f) loop needs more generation capacity and the other could give up some generation capacity. Then, grid V-f could be maintained without the need for load shedding.

The power regulator has priority over the V-f regulator because the power regulator guarantees the capacity constraints that are closely related to DC voltage stability. Hence, a power regulator usually has larger controller gains and higher bandwidth than a V-f regulator.

IV. Static Feasibility and Small Signal Stability

This section proves static fixability and small signal stability of the provided control framework through algebraic formulation and eigenvalue analysis.

Static Feasibility

In examples, the provided microgrid control framework has two main functionalities: 1) regulate the output of GFM inverters through load re-sharing; 2) improve V-f deviation by reallocating generation capability along the constrained boundary in FIG. 3B. The mechanism of load re-sharing is similar to that of the adaptive droop gain method. Hence, this subsection mainly verifies the second functionality through algebraic formulation.

The V-f regulator can be identical to the conventional secondary controller when DER capacity is adequate, which improves V-f deviation by adjusting the output of inverter-based generations. It changes to a constrained secondary controller in the transition zone when the load is close to the total generation. In the following, the static equilibrium can be derived when the total generation is insufficient, based on which the state change in the transition zone is further derived.

1. Static Equilibrium

With the focus on a general islanded microgrid formed by N inverters, each inverter can be connected to an independent bus with a local V-f dependent load. Under droop control and the provided framework, there are 6N independent equations, including 2N droop equations in Equation (10), 2N load equations in Equation (11), and 2N power flow equations in Equation (12).

$$\begin{cases} f = f_{0,i} + k_{df}(P_{inv,i} - P_{inv0,i}) \\ V_i = V_{0,i} + k_{dv}(Q_{inv,i} - Q_{inv0,i}) \end{cases} \tag{10}$$

$$\begin{cases} P_{l,i} = P_{l0,i}(p_1 V_i^2 + p_2 V_i + p_3)[1 + K_{pf}(f - f_0)] \\ Q_{l,i} = Q_{l0,i}(q_1 V_i^2 + q_2 V_i + q_3)[1 + K_{pf}(f - f_0)] \end{cases} \tag{11}$$

$$\begin{cases} P_i = P_{inv,i} + P_{l,ii} = G_{ij}V_i^2 - G_{ij}\sum_{i\neq j} V_i V_j \cos\theta_{ij} - B_{ij}\sum_{i\neq j} V_i V_j \cos\theta_{ij} \\ Q_i = Q_{inv,i} + Q_{l,i} = G_{ij}V_i^2 - G_{ij}\sum_{i\neq j} V_i V_j \cos\theta_{ij} - B_{ij}\sum_{i\neq j} V_i V_j \cos\theta_{ij} \end{cases} \tag{12}$$

where f is the global steady state frequency; and $f_{0,i}$ and $V_{0,i}$ are the nominal frequency and voltage of the ith inverter, respectively. When the reference inverter has a power angle $\vartheta=0$, and then there are 6N decision variables in Equations (10)-(12), including 1 global frequency, N voltage, N–1 power angle, N active inverter output, N active load, N active inverter output, and N reactive inverter output. The number of decision variables equals the total number of equations. Thus, the new equilibrium after a given disturbance can be calculated, allowing further estimation of the provided method to reduce load shedding.

2. State Transition Under Constrained DER Capacity

In initial equilibrium, $P_{inv,i}=P_{inv0,i}$ and $Q_{inv,i}=Q_{inv0,i}$. Then, there can be a step increase in the base load and capacity constraints on the inverters.

$$\begin{cases} \text{Load: } \begin{cases} P'_{l0,i} = P_0 + \Delta P \\ Q'_{l0,i} = Q_0 + \Delta Q \end{cases} \forall\, i = 1, 2, \ldots, N \\ \text{Generation: } P'^2_{g,i} + Q'^2_{g,i} = S_i^2 \end{cases} \tag{13}$$

The original equilibrium will transition to a new equilibrium while also meeting the network power flow and power balance constraints as follows.

$$\begin{cases} P'_i = P'_{inv,i} + P'_{l,i} \\ \quad = G_{ij}V_i'^2 - G_{ij}\sum_{i\neq j} V_i' V_j' \cos\theta'_{ij} - B_{ij}\sum_{i\neq j} V_i' V_j' \cos\theta_{ij}' \forall\, i, j, i \neq j \\ Q'_i = Q'_{inv,i} + Q'_{l,i} \\ \quad = G_{ij}V_i'^2 - G_{ij}\sum_{i\neq j} V_i' V_j' \cos\theta'_{ij} - B_{ij}\sum_{i\neq j} V_i' V_j' \cos\theta_{ij}' \forall\, i, j, i \neq j \end{cases} \tag{14}$$

where the prime symbols mark the new state variables.

During the transition, the conventional droop control is rendered ineffective, and the 2N droop equations are replaced by N bounded capacity constraints. This gives us freedom to design the new generation output. Given that $P_{g,i}'$ and $Q_{g,i}'$ meet the capacity constraints in Equation (13), there are 4N state variables and 4N equations left. Then, for each ($P_{g,i}''$, $Q_{g,i}''$) point on the capacity circle, the corresponding new equilibrium V-f deviation is solvable, as the number of equations and decision variables are identical.

B. Small Signal Stability

The power system model can be composed of differential equations and algebraic equations. The provided power regulator and V-f regulator are incorporated into the conventional droop control controller in FIG. 1. Then, the complete dynamic model of microgrids can be expressed as a set of differential-algebraic equations (DAEs) as follows.

$$\begin{cases} \dot{x} = f(x, y) \\ 0 = g(x, y) \end{cases} \tag{15}$$

where x is the state variable and x=[$\varphi_{vs}$, $\varphi_{fs}$, $\varphi_v$, $\varphi_f$, $\varphi_{ud}$, $\varphi_{uq}$, $\varphi_{id}$, $\varphi_{iq}$, $\varphi_p$, $V_d$, $V_q$, $i_d$, $i_q$, $P_m$, $Q_m$, $i_{gd}$, $i_{gq}$]; y is the algebraic variable and y=[$v_{dref}$, $V_{qref}$, $i_{dref}$, $i_{qref}$, $e_d$, $e_q$, P, Q].

After linearizing the DAEs in Equation (15), the small-signal model is obtained via Equation (16). Then, the state matrix A can be calculated by eliminating the algebraic variables. Due to the fact that the V-f regulator consists of piecewise functions, each linear part can be analyzed according to initial operating points.

$$\begin{bmatrix} \Delta\dot{x} \\ 0 \end{bmatrix} = \begin{bmatrix} f_x & f_y \\ g_x & g_y \end{bmatrix} \begin{bmatrix} \Delta x \\ \Delta y \end{bmatrix} \tag{16}$$

$$A = f_x - f_y g_y^{-1} g_x \tag{17}$$

Small signal stability can guarantee the stability of the system only around a specific equilibrium. As Equation (8) and Equation (9) are nonlinear functions with deadbands, time-domain simulation (TDS) was required to validate the stable transition between equilibriums.

C. Exemplified in an Ideal System

Figure 5:
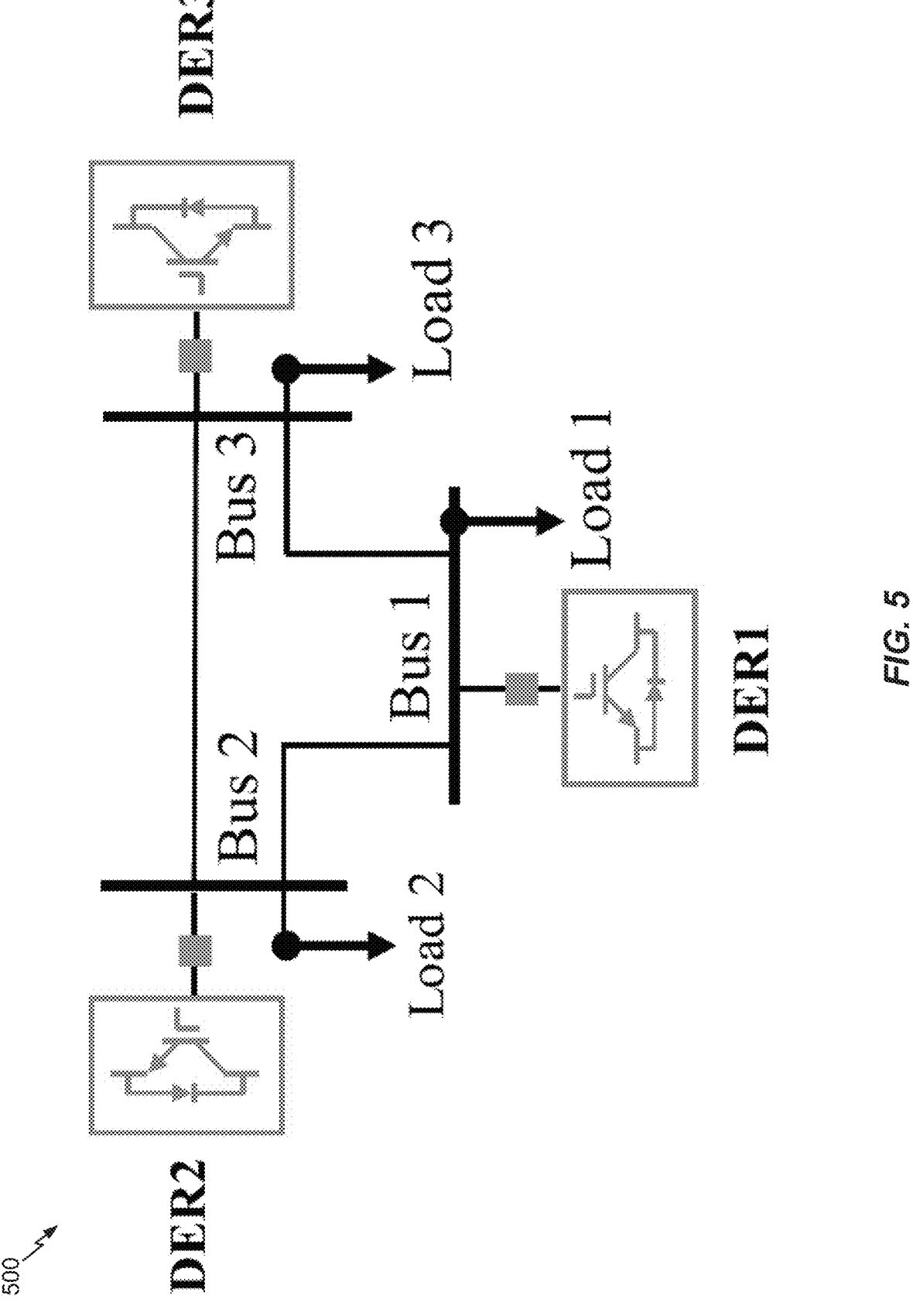
FIG. 5 depicts an example ideal three-inverter system.

FIG. 5 depicts an example ideal three-inverter system 500. This subsection exemplifies the static feasibility and small signal stability of an ideal three-inverter system in FIG. 5.

1. Static Feasibility

Figure 6:
FIG. 6 depicts an example V-f deviation under bounded generation constraints.

In examples, there can be an intentional load increase at the initial operating point ($P_0$, $Q_0$). Then, Equation (13) and Equation (14) provide the new equilibrium after an intentional load change under the condition that the conventional primary controller becomes invalid. FIG. 6 depicts an example V-f deviation 600 under bounded generation constraints. FIG. 6 shows the new equilibriums when implementing different generation strategies under various load increases. To facilitate observation, the high-dimensional state space can be projected into two-dimensional $\Delta V_1 - \Delta f$ space, where $\Delta V_1$ is Bus 1 voltage deviation. Based on FIG. 6, there are the following observations:

First, for Load=102% $S_r$ and Load=105% $S_r$, although the total load is larger than the generation capacity, load-generation balance can still be achieved without performing load shedding because there are some new equilibriums inside the black security rectangle that meet the V-f deviation requirements.

Second, if the current operating point is located outside the black security rectangle where the V-f regulator may be triggered, the P-Q generation can be adjusted along the bounded generation circle until the operating point comes back to the acceptable region.

Third, if the total load is too large, e.g., Load=108% $S_r$, load shedding is required since there is no operating point inside the security rectangle. But the shed load could be less than conventional strategies to reduce unnecessary involuntary load shedding. For example, 3% to 5% is enough to improve V-f deviation using demand control.

2. Small Signal Stability

We then choose an operating point outside the black security rectangle in FIG. 6 and calculate the eigenvalues of A. To verify the robustness of the provided method, the eigenvalues are plotted by sweeping control parameters in three different ways.

Condition 1: sweep droop gain [$k_{dp}$, $k_{dv}$] without the integration of the provided control framework.

Condition 2: sweep droop gain [$k_{dp}$, $k_{dv}$] with the integration of the provided control framework.

Condition 3: sweep power regulator gain [$k_w$, $k_v$] with the integration of the provided control framework.

Figure 7A:
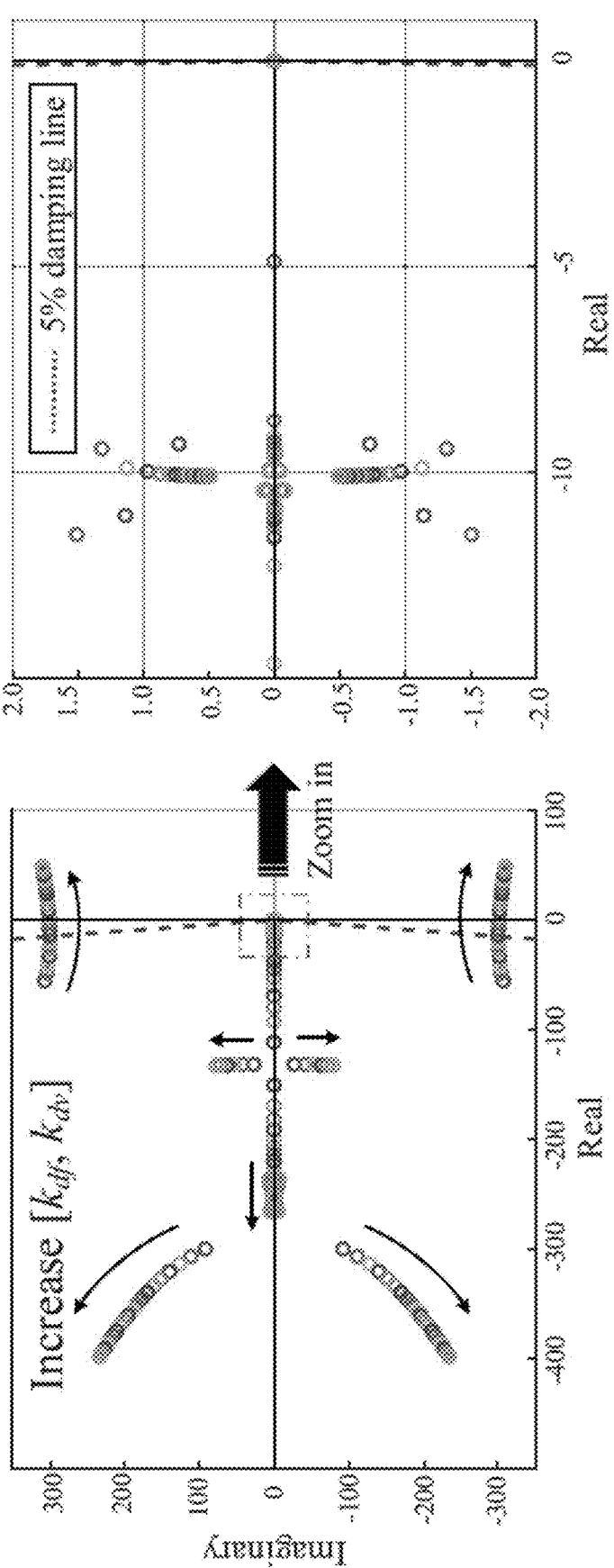
FIG. 7A depicts examples of Eigenvalue trajectories when sweeping control parameters during example Condition One and crossing droop gain $[k_{df}, k_{dv}]$=[0.025, 0.125].

FIG. 7A depicts examples of Eigenvalue trajectories 700 when sweeping control parameters during example Condition One and crossing droop gain [$k_{dp}$, $k_{dv}$]=[0.025, 0.125].

Figure 7B:
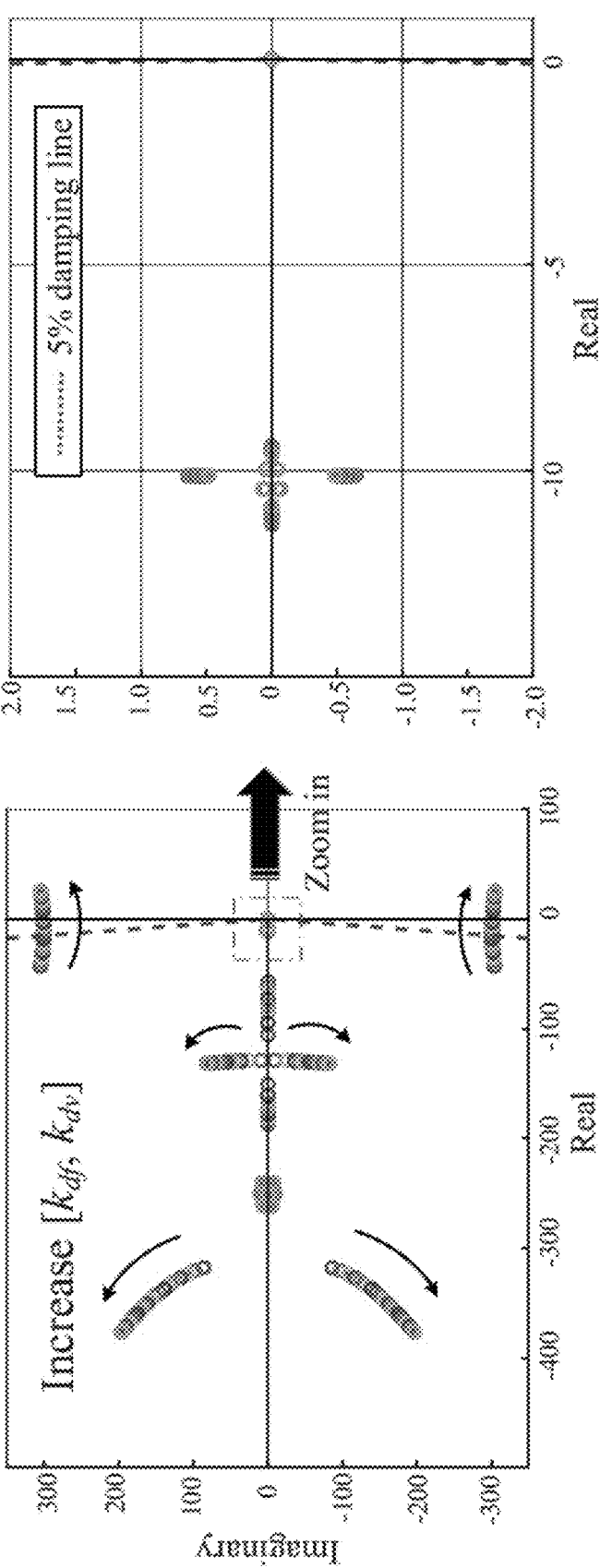
FIG. 7B depicts examples of Eigenvalue trajectories when sweeping control parameters during example Condition Two and crossing droop gain $[k_{df}, k_{dv}]$=[0.0165, 0.0825].

FIG. 7B depicts examples of Eigenvalue trajectories 730 when sweeping control parameters during example Condition Two and crossing droop gain [$k_{dp}$, $k_{dv}$]=[0.0165, 0.0825].

Figure 7C:
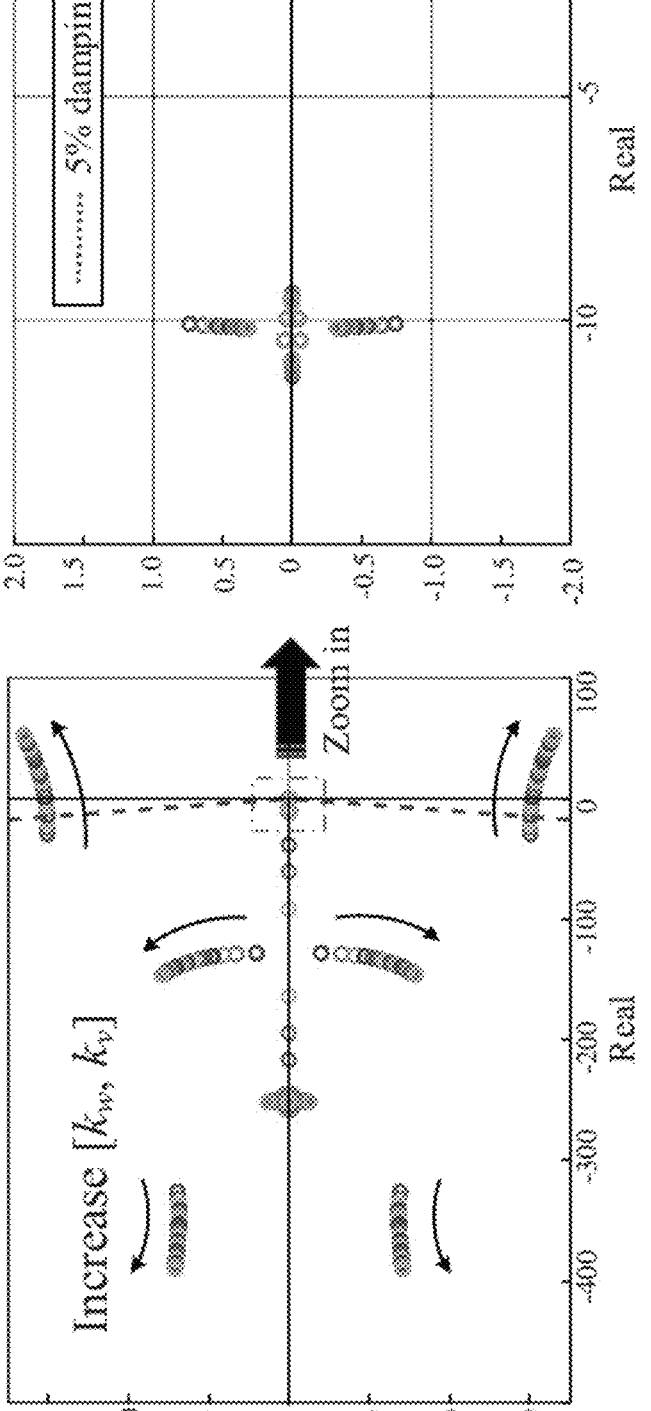
FIG. 7C depicts examples Eigenvalue trajectories when sweeping control parameters during example Condition Three and crossing power regulator gain $[k_w, k_v]$=[0.0825, 0.0619].

FIG. 7C depicts examples Eigenvalue trajectories 760 when sweeping control parameters during example Condition Three and crossing power regulator gain [$k_w$, $k_v$]=[0.0825, 0.0619].

The eigenvalue trajectories under Conditions 1, 2, and 3 are shown in FIGS. 7A, 7B, and 7C, respectively, where the critical gains that force the eigenvalue to cross the y axis are also marked in the title. Based on FIGS. 7A, 7B, and 7C, there are the following observations:

First, in Conditions 1 and 2, all the eigenvalues are on the left half-plane before and after the integration of the provided method. Then, increasing the droop gains could result in instability, which shows that the system maintains a specific stability margin if tuned properly.

Second, Condition 2 has smaller crossing gains than those of Condition 1. The integration of the provided framework method could decrease the stability margin of the original system, but it still preserves a specific yet sufficient margin for increasing the power regulator gains, as shown in Condition 3.

V. Case Study in A Real Microgrid

This section verifies the functionalities of the provided method in a modified real microgrid, and further demonstrates its transient performance between different equilibriums.

A. Case Overview

Figure 8:
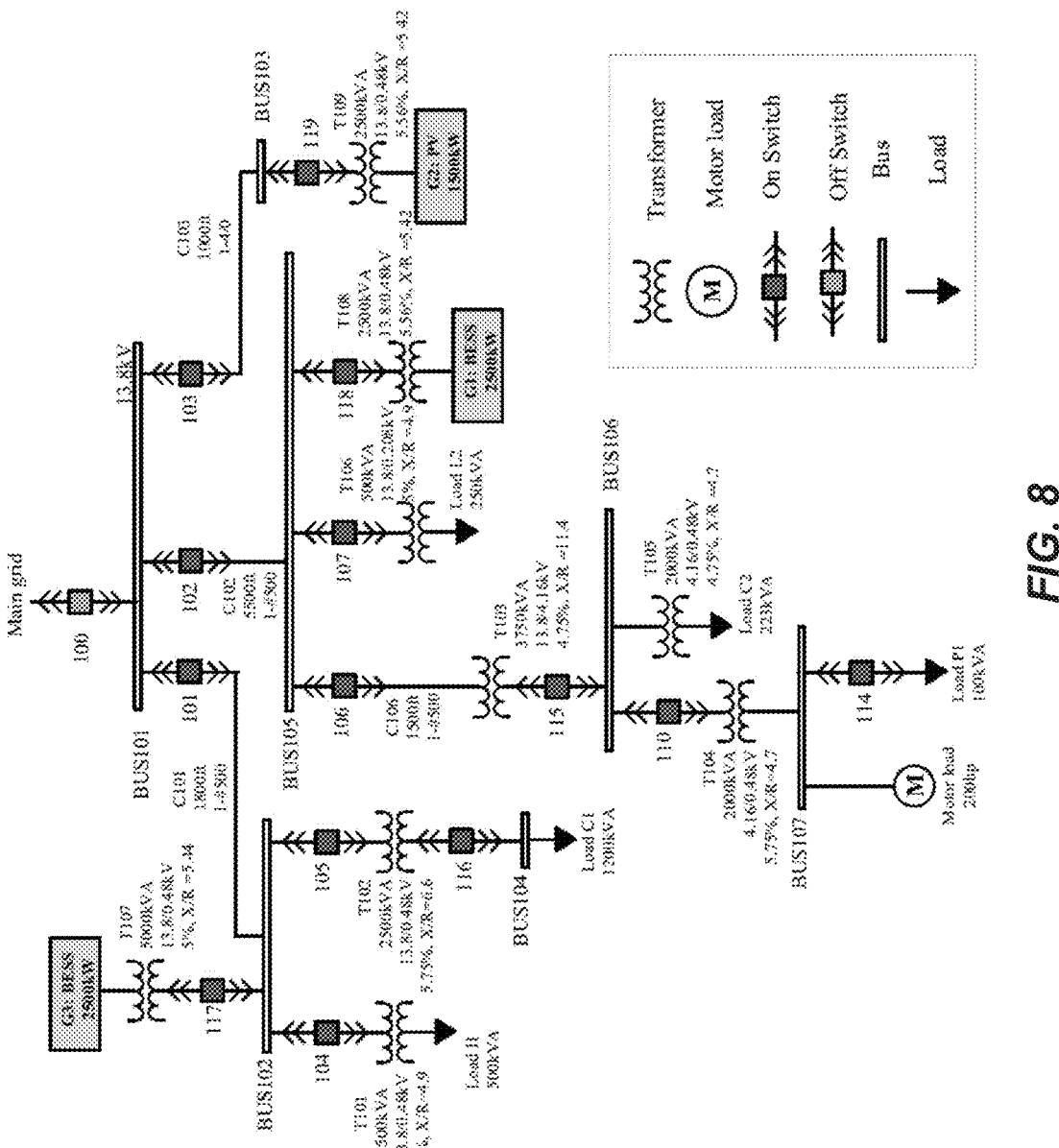
FIG. 8 depicts an example islanded microgrid.

FIG. 8 depicts an example islanded microgrid 800. The microgrid shown in FIG. 8 operates in islanded mode with switch 100 off. The microgrid can be modified from Banshee distribution system by replacing the diesel generator on BUS 103 with a battery energy storage system (BESS) and connecting a PV and a BESS to BUS 102 and 105, respectively. The three GFM inverters are named G1, G2, and G3 in FIGS. 7A, 7B, and 7C. The microgrid also supplies the static V-f dependent ZIP load and motor load. The load parameters and inverter control parameters are listed in Tab. 1 and Tab. 2, respectively. All the simulations can be run in MATLAB® version R2020a, with a PC Intel® Core i7-8665U CPU at 2.10 GHz and 16 GB RAM.

Two test scenarios are designed to validate the key functionalities of the provided control framework. Scenario 1 focuses on inverter power regulation, while Scenario 2 focuses on the cooperation of the power regulator and V-f regulator, which leverage the limited DER capacity and demand control to improve V-f deviation and reduce involuntary load shedding. In addition, a current limiter can be a baseline to show the advantages of the provided method.

B. Scenario 1: Inverter Power Regulation

Following the timeline, the basic settings of Scenario 1 are three-fold: (i) before 8 s, G1-G3 are controlled with the conventional droop method represented in FIG. 1; (ii) at 8 s, the inverter power regulators of G1-G3 are implemented and triggered immediately. Meanwhile, the real-time reference capacities of G1-G3 are set as 1.2 MVA, 0.6 MVA, and 2.0 MVA, respectively; and (iii) at 12 s, load C2 connected to Bus 106 increases by 200 kW, 100 kVar.

1. Performance of Power Regulator

Figure 9A:
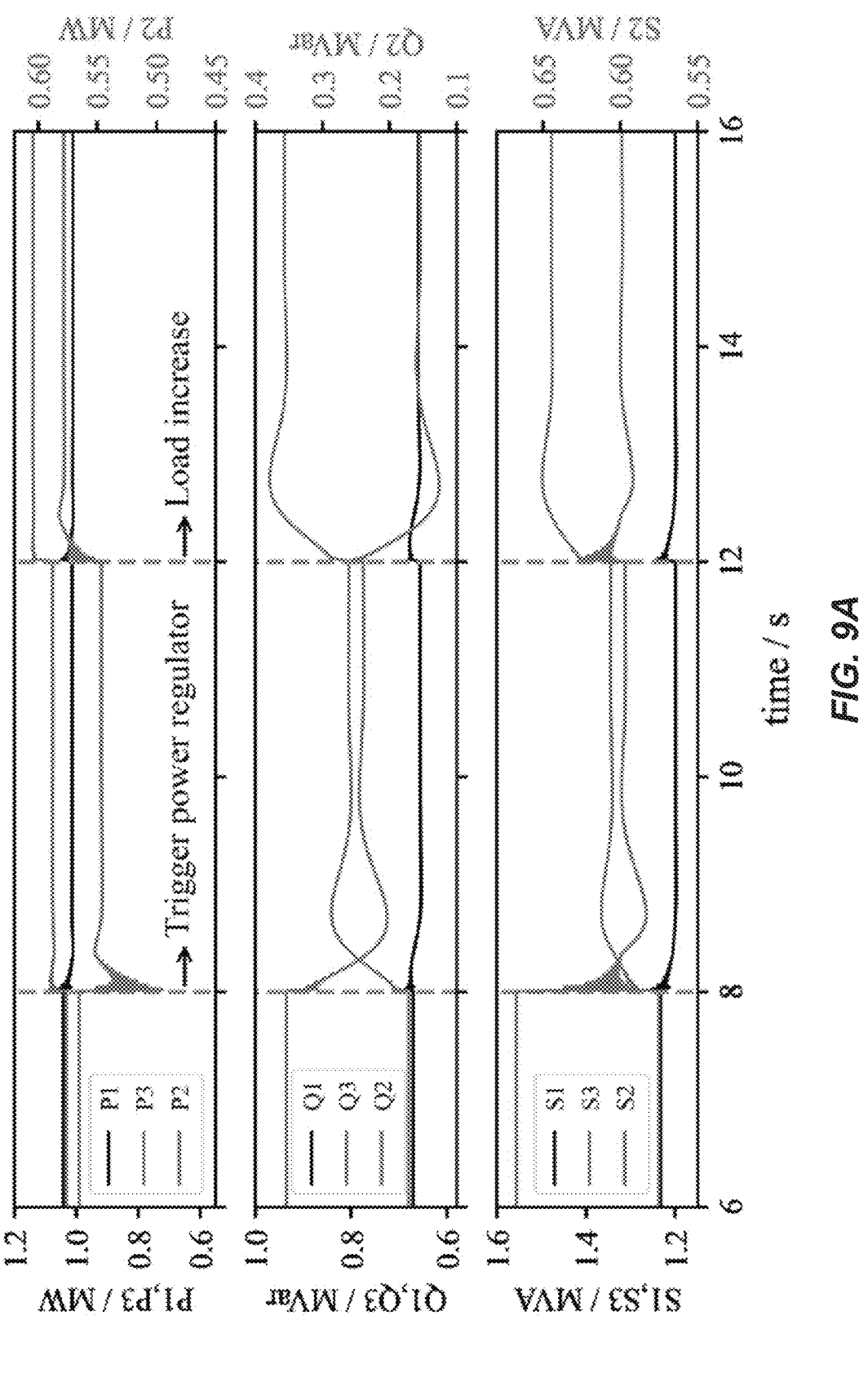
FIG. 9A depicts an example dynamic inverter output of a power regulator in example Scenario One.

FIG. 9A depicts an example dynamic inverter output 900 of a power regulator in example Scenario One. FIG. 9A depicts the dynamic output of G1-G3.

Figure 9B:
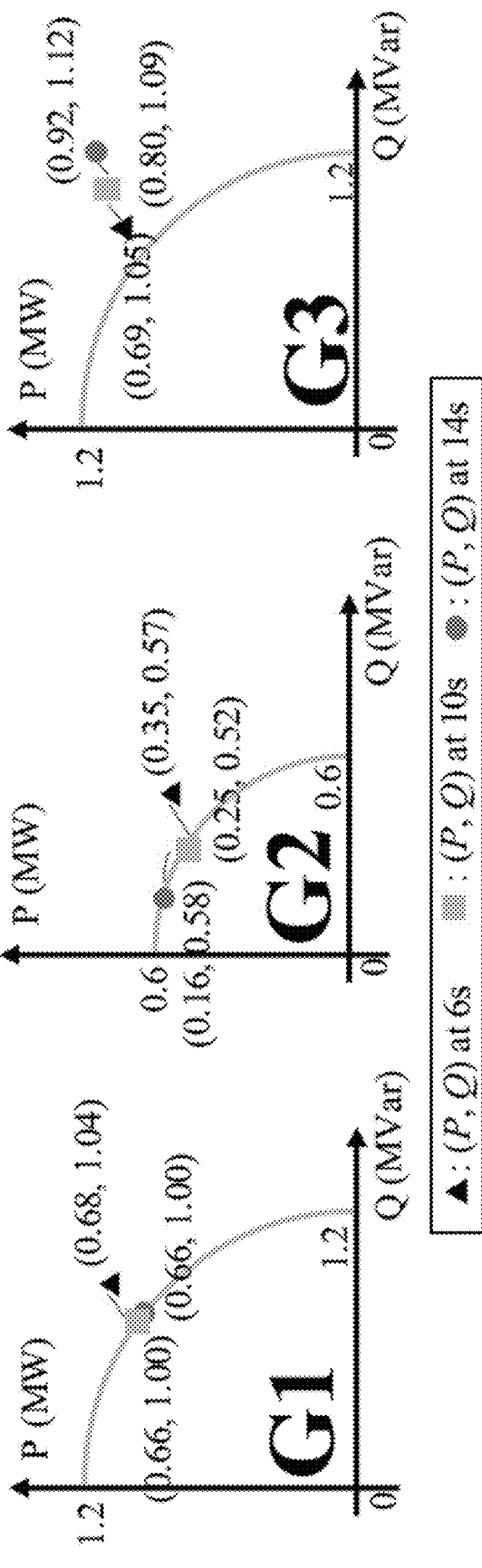
FIG. 9B depicts an example static inverter output of the power regulator in example Scenario One.

FIG. 9B depicts an example static inverter output 930 of the power regulator in example Scenario One.

Figure 9C:
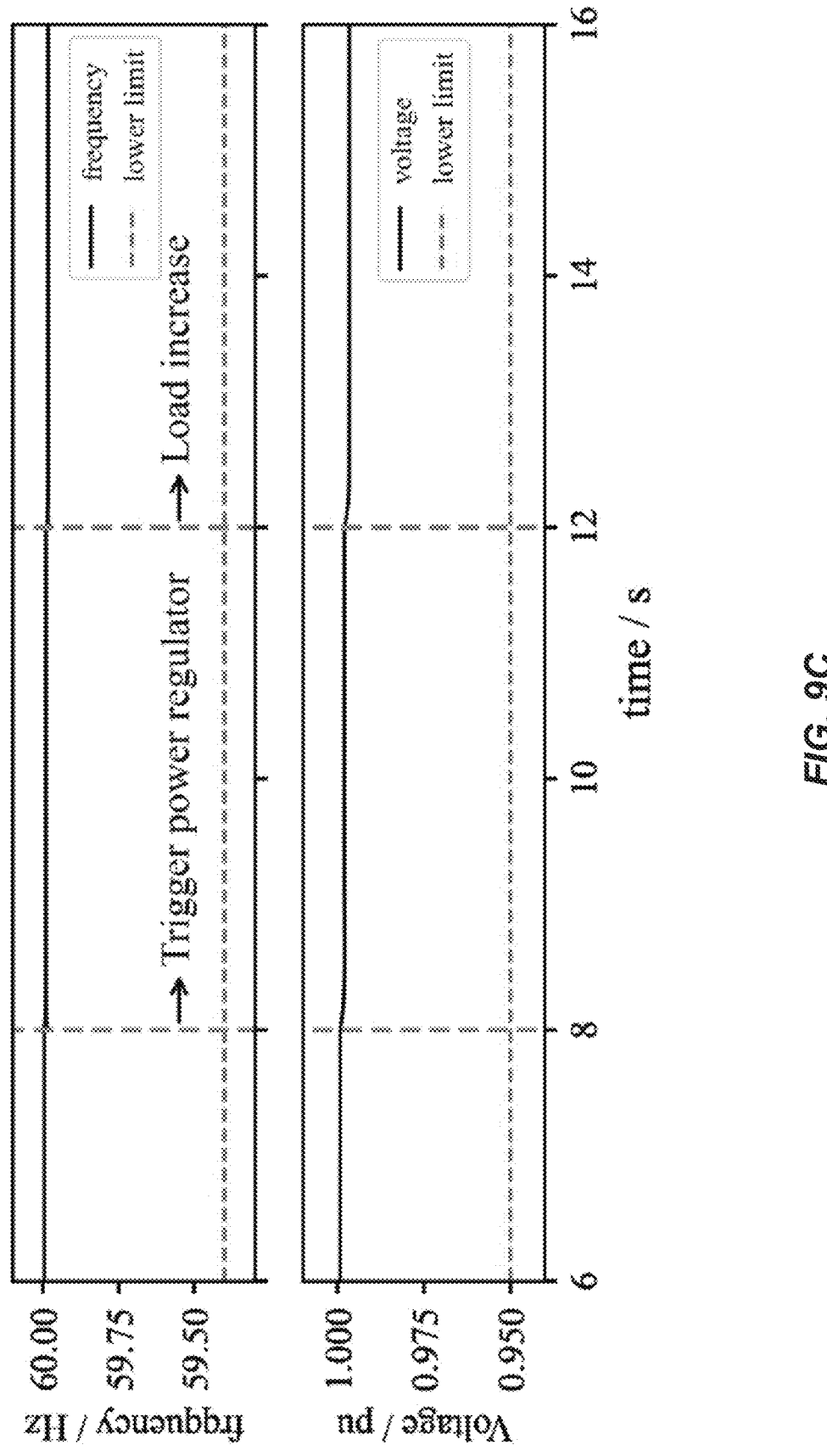
FIG. 9C depicts an example dynamic frequency and voltage of the power regulator in example Scenario One.

FIG. 9C depicts an example dynamic frequency and voltage 960 of the power regulator in example Scenario One.

In FIG. 9A, the output of G1 and G3 follows the left axis, while the output of G2 follows the right axis, based on which there are the following observations:

First, according to the initial setting point ($P_0$, $Q_0$) and droop gains ($k_{dp}$, $k_{dv}$) before 8 s, all the load is automatically shared among G1, G2, and G3 as 1.24 MVA, 0.67 MVA, and 1.24 MVA, respectively.

Second, at 8 s, S1 and S2 violate the real-time capacity constraints, and the power regulator starts working. Then, P1, Q1, P2, and Q2 decrease until S1 and S2 are regulated to the reference value.

Third, even though there is a sudden load increase at 12 s, S1 and S2 still converge to the reference value. Meanwhile, P3, Q3, and S3 increase at 8 s and 12 s to compensate for the decreased generation and the increased load.

TABLE 1

| | ZIP load parameters | | |
|---|---|---|---|
| Load | P composition/ [$P_1$, $P_2$, $P_3$] | Q composition/ [$q_1$, $q_2$, $q_3$] | V-f sensitivity/ [$k_{pf}$, $k_{qf}$] |
| L1 | 0.1, 0.3, 0.6 | 0.5, 0.3, 0.2 | 2, −0.1 |
| L2 | 0.6, 0.2, 0.2 | 0.6, 0.2, 0.2 | 2.5, −2 |
| C1 | 0.5, 0.3, 0.2 | 0.2, 0.3, 0.5 | 3, −0.1 |
| C2 | 0.4, 0.3, 0.3 | 0.4, 0.3, 0.3 | 1, −0.5 |
| P2 | 0.5, 0.3, 0.2 | 0.5, 0.3, 0.2 | 3, −1 |

TABLE 2

| | Inverter control parameters | | | |
|---|---|---|---|---|
| Parameter | | G1 | G2 | G3 |
| Filter | $L_f$/H | $5 \times 10^{-5}$ | $2.5 \times 10^{-5}$ | $5 \times 10^{-5}$ |
| | $C_f$/F | $1 \times 10^{-5}$ | $1 \times 10^{-5}$ | $1 \times 10^{-5}$ |
| Current regulator gains [$k_p$, $k_i$] | | [0.5, 2] | [0.5, 2] | [0.5, 2] |
| Voltage regulator gains [$k_p$, $k_i$] | | [0.1, 1] | [0.1, 1] | [0.1, 1] |

TABLE 2-continued

| | Inverter control parameters | | |
|---|---|---|---|
| Parameter | G1 | G2 | G3 |
| Droop gains | [0.01, | [0.005, | [0.01, |
| [$k_{df}$, $k_{dv}$] | 0.05] | 0.025] | 0.05] |
| Power regulator | [0.2, 4, | [0.1, 2, | [0.2, 4, |
| gains [$k_{ps}$, $k_{is}$, $k_{iv}$, $k_v$] | 0.008, | 0.004, | 0.008, |
| | 0.006] | 0.003] | 0.006] |
| V-f regulator gains | [0.05, 1, | [0.05, 1, | [0.05, 10, |
| [$k_{pf}$, $k_{if}$, $k_{pv}$, $k_{iv}$] | 0.05, 1] | 0.05, 1] | 0.05, 1] |

FIG. 9B further presents three static operating points at 6 s, 10 s, and 14 s. In FIG. 9B, the circle and square operating points of G1 and G2 lie exactly on the capacity boundary after triggering the power regulator.

In FIG. 9C, the voltage and frequency are measured at the terminal of G3, and they hardly change after the power regulator starts working. This indicates that the power regulator is able to regulate the output of GFM inverters without significantly affecting the grid's voltage and frequency.

2. Comparison with the Current Limiter

The existing current limiter can be mainly designed for protecting devices in abnormal conditions, and the threshold can be usually set at 2 p.u. to 3 p.u. To make the threshold more comparable with the provided method, the threshold can be adaptively updated according to the real-time DER capacity. In addition, the DER capacity can be preferentially allocated to the frequency regulation loop.

Figure 10A:
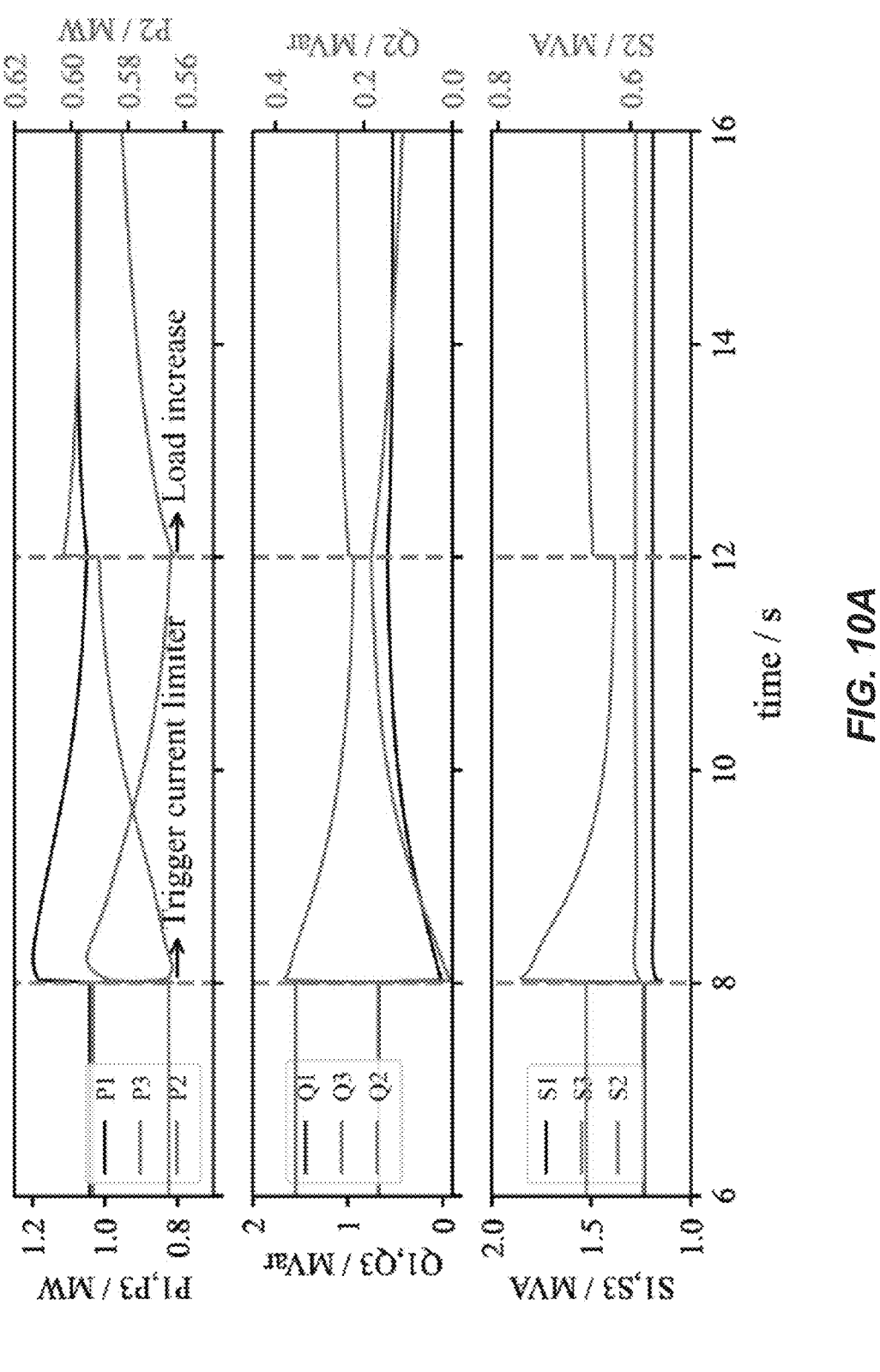
FIG. 10A depicts an example dynamic inverter output of a current limiter in example Scenario One.

FIG. 10A depicts an example dynamic inverter output 1000 of a current limiter in example Scenario One.

Figure 10B:
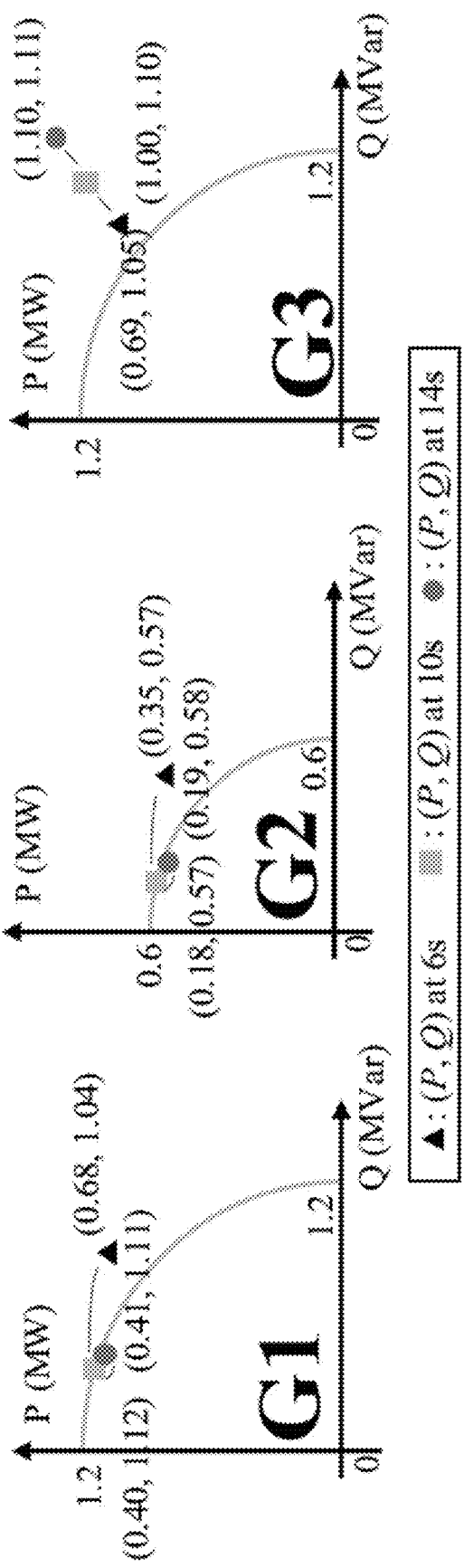
FIG. 10B depicts an example static inverter output of the current limiter in example Scenario One.

FIG. 10B depicts an example static inverter output 1030 of the current limiter in example Scenario One.

Figure 10C:
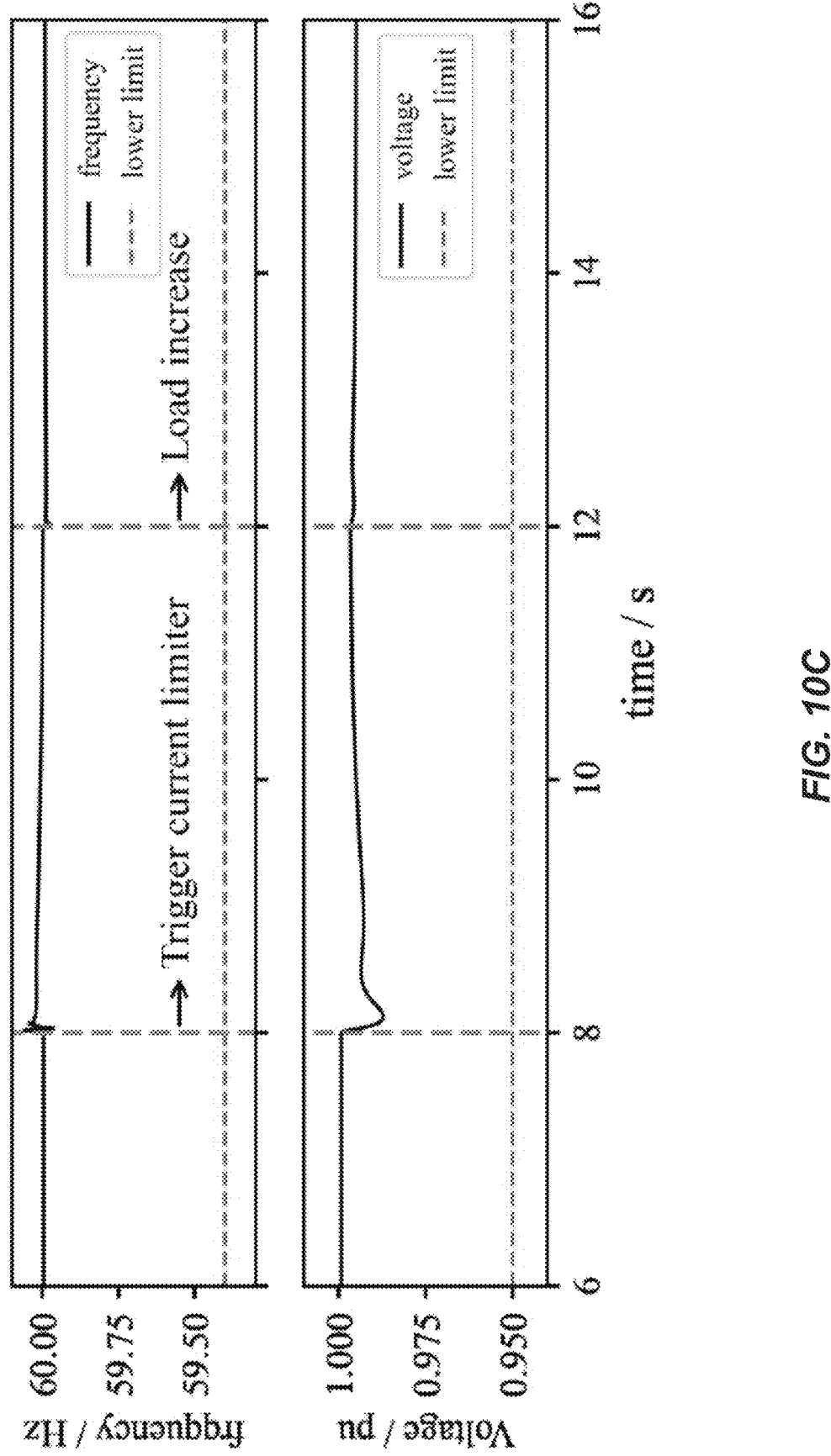
FIG. 10C depicts an example dynamic frequency and voltage of the current limiter in example Scenario One.

FIG. 10C depicts an example dynamic frequency and voltage 1060 of the current limiter in example Scenario One.

The performance of the current limiter is shown in FIGS. 10A, 10B, and 10C. After triggering the current limiter, the output of G1 and G2 can be limited to their real-time generation capacities. However, the sudden limit results in larger voltage and frequency deviations around 8 s, as detailed in FIG. 10C.

C. Scenario 2: Cooperation of Power Regulator and V-f Regulator

In the transition zone shown in FIG. 2, the conventional primary and secondary controllers become invalid due to the saturation caused by insufficient DER capacity. Then, the cooperation of power regulator and V-f regulator becomes important. Scenario 2 is further divided into two parts, Scenario 2-1 and Scenario 2-2, to show their cooperation under various load change. Specifically, load C2 increases by 100 KW, 200 kVar in Scenario 2-1 and by 200 kW, 100 kVar in Scenario 2-2. Following the timeline, Scenario 2-1 and Scenario 2-2 have the same settings as follows, and their grid performance is shown in FIGS. 11A, 11B, 11C, 12A, 12B, and 12C.

Figure 11A:
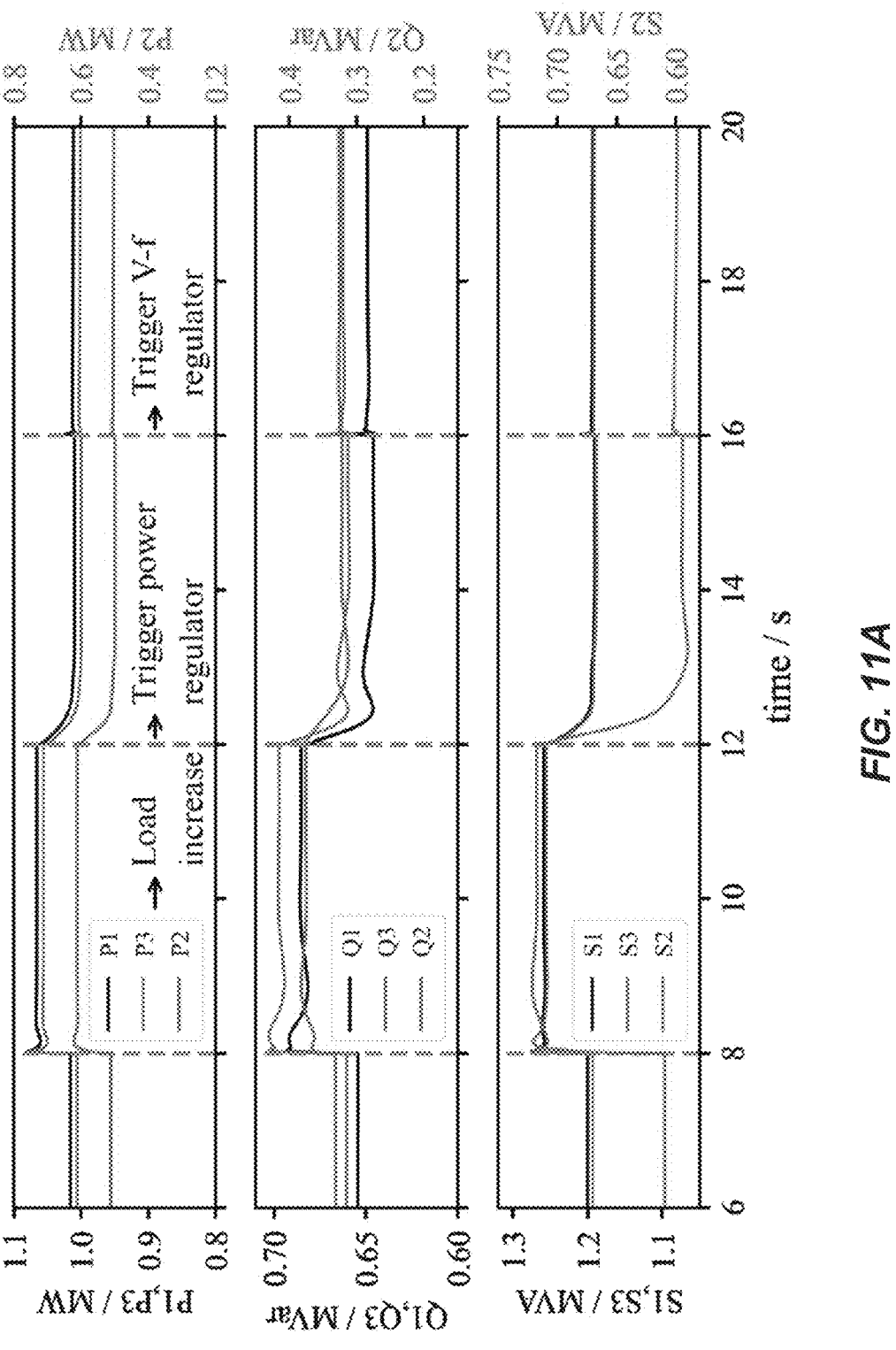
FIG. 11A depicts an example dynamic inverter output of a control framework in example Scenario Two-One.

FIG. 11A depicts an example dynamic inverter output 1100 of a control framework in example Scenario Two-One.

Figure 11B:
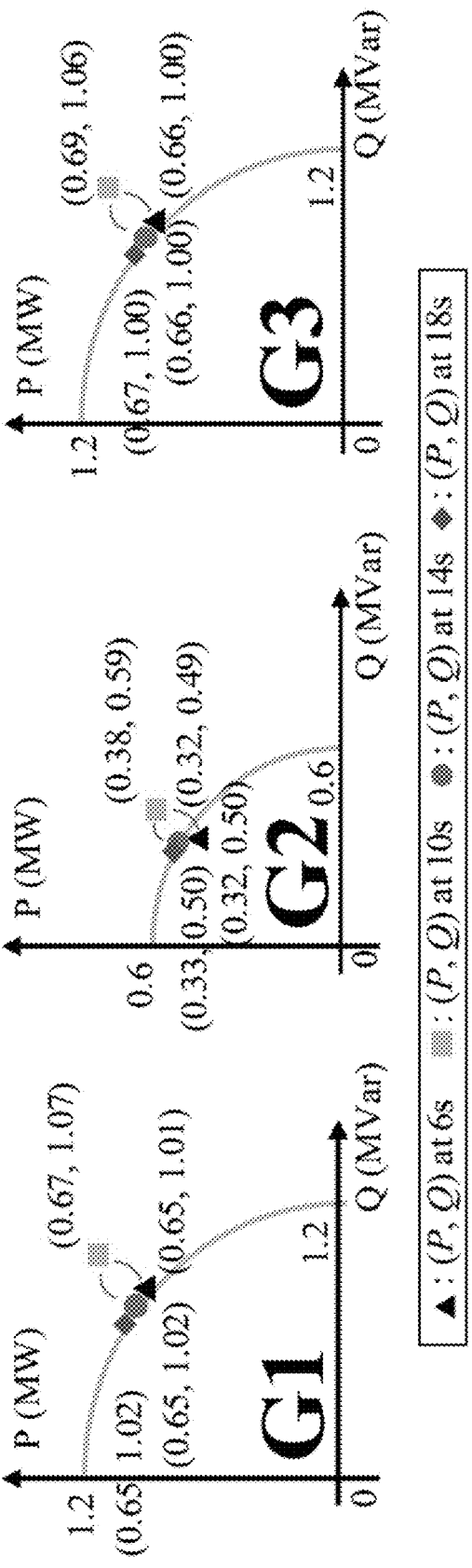
FIG. 11B depicts an example static inverter output of the control framework in example Scenario Two-One.

FIG. 11B depicts an example static inverter output 1130 of the control framework in example Scenario Two-One.

Figure 11C:
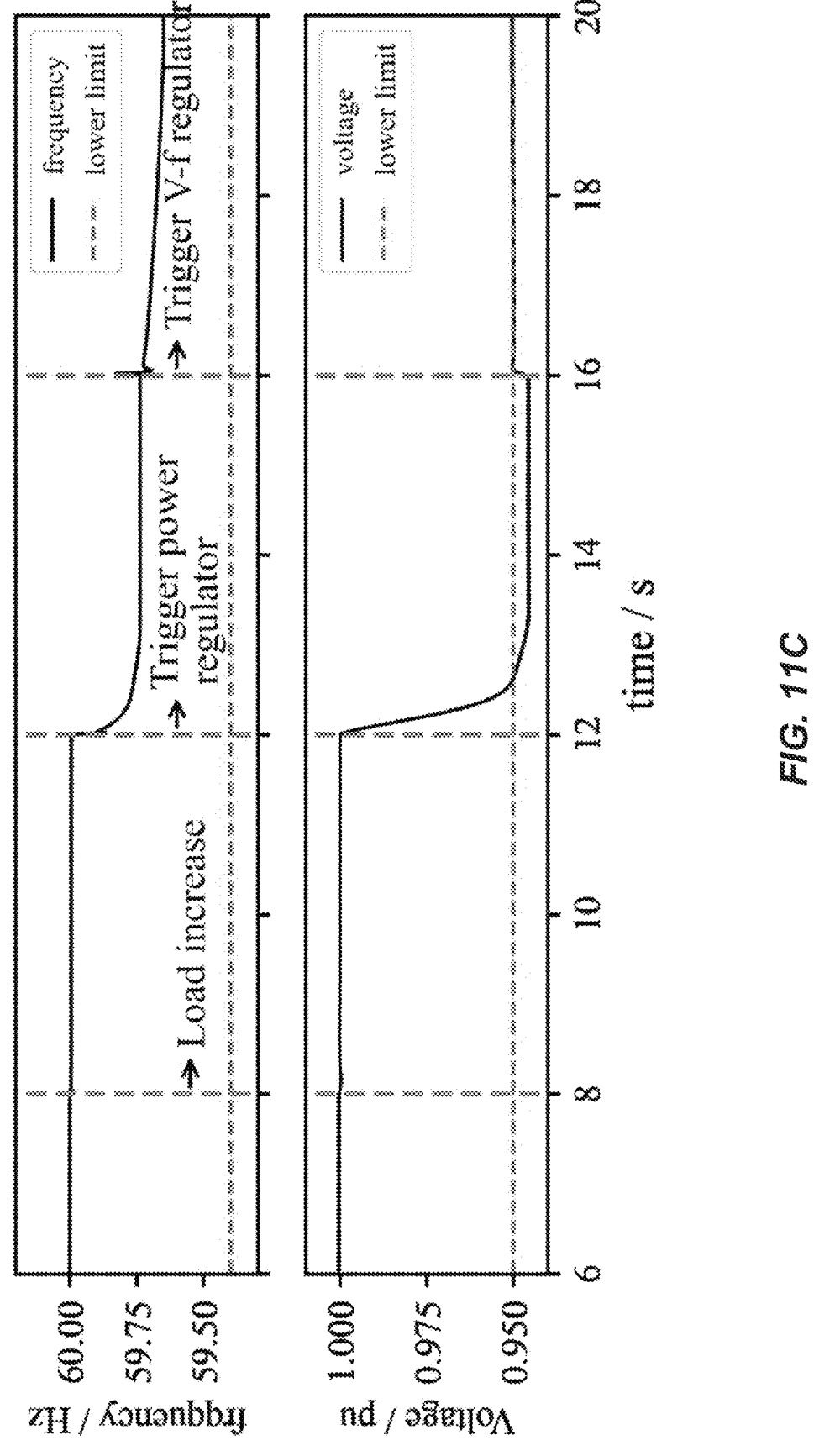
FIG. 11C depicts an example dynamic frequency and voltage of the control framework in example Scenario Two-One.

FIG. 11C depicts an example dynamic frequency and voltage 1160 of the control framework in example Scenario Two-One.

Figure 12A:
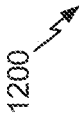
FIG. 12A depicts an example dynamic inverter output of a control framework in example Scenario Two-Two.

FIG. 12A depicts an example dynamic inverter output 1200 of a control framework in example Scenario Two-Two.

Figure 12B:
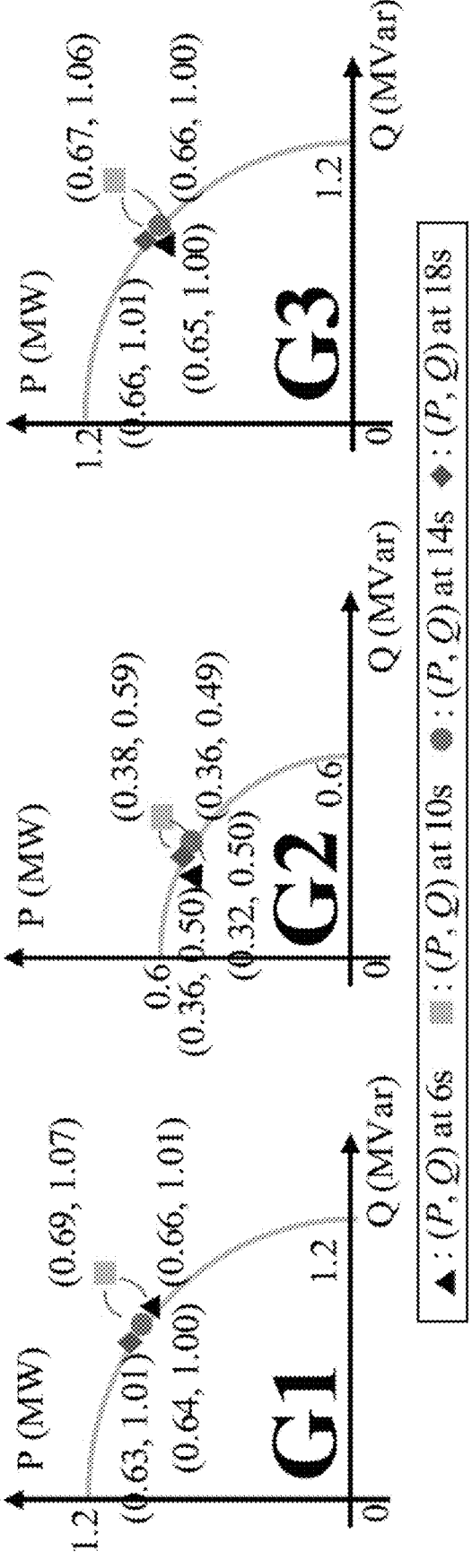
FIG. 12B depicts an example static inverter output of the control framework in example Scenario Two-Two.

FIG. 12B depicts an example static inverter output 1230 of the control framework in example Scenario Two-Two.

Figure 12C:
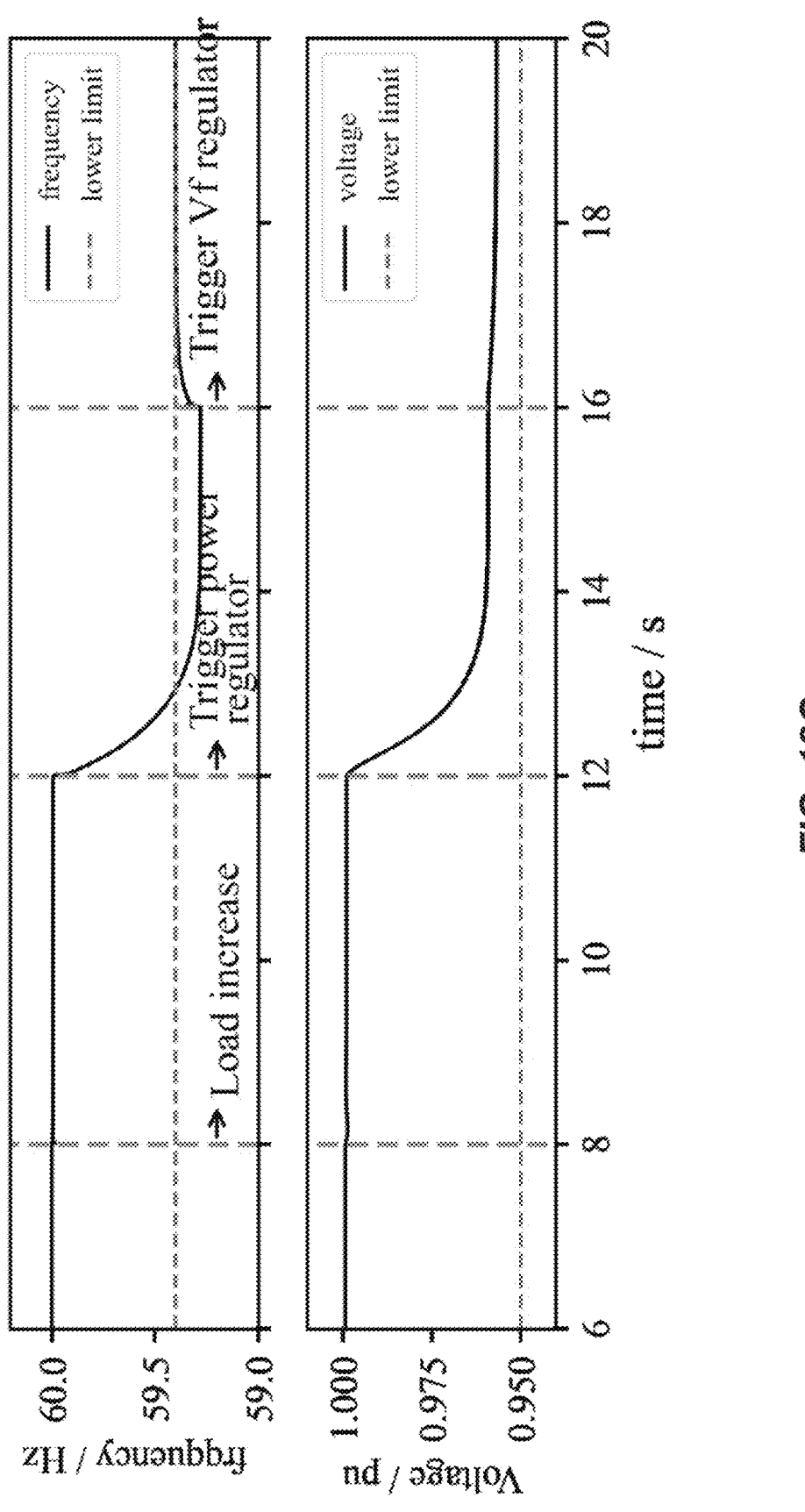
FIG. 12C depicts an example dynamic frequency and voltage of the control framework in example Scenario Two-Two.

FIG. 12C depicts an example dynamic frequency and voltage 1260 of the control framework in example Scenario Two-Two.

Before 8 s, G1-G3 are controlled with the conventional droop method represented in FIG. 1. At 8 s, load C2 increases. At 12 s, the reference capacities of G1-G3 are set as 1.2 MVA, 0.6 MVA, and 1.2 MVA, respectively. The total load is thus larger than the total generation capacity, and the power regulator starts working. At 16 s, the V-f regulator starts working.

1. Performance of the Control Framework

FIGS. 11A, 11B, and 11C depict performance of provided control method in Scenario 2-1. FIGS. 12A, 12B, and 12C show the performance of provided control method in Scenario 2-2. These figures demonstrate the cooperation of the power regulator and V-f regulator.

In FIGS. 11A and 12A, as a result of different load change, Scenario 2-1 and Scenario 2-2 have distinct load sharing results after 8 s. At 12 s, the power regulator starts working. S1, S2, and S3 are regulated to 1.2 MVA, 0.6 MVA, and 1.2 MVA around 12.5 s, which are exactly equal to the reference capacities. The reduced generation can be compensated by the load response to V-f regulation (load power decreases as V-f decrease). S1-S3 remain unchanged after triggering the V-f regulator at 16 s, indicating that the power regulator and the V-f regulator work well together.

FIGS. 11B and 12B show the static operating points at 6 s, 10 s, 14 s, and 18 s. After the power regulator is turned on, the circle and square operations of G1-G3 all fall on the constrained boundary.

FIGS. 11C and 12C show the dynamic frequency and voltage measured at the terminal of G3. Both frequency and voltage have an obvious dip at 12 s because the total load is larger than the generation capacity. To achieve load-generation balance again, the load power decreases after the voltage and frequency dip. Scenario 2-1 and Scenario 2-2 have different V-f regulation results due to distinct load change. Scenario 2-1 has more reactive power increase and thus a larger voltage dip, while Scenario 2-2 has more active power increase and thus a larger frequency dip. From 12 s to 16 s, the voltage in Scenario 2-1 and the frequency in Scenario 2-2 violate the requirements of V-f deviation. The violations are mitigated after the trigger of the V-f regulator at 16 s without performing any load shedding.

2. Comparison with the Current Limiter

Figure 13A:
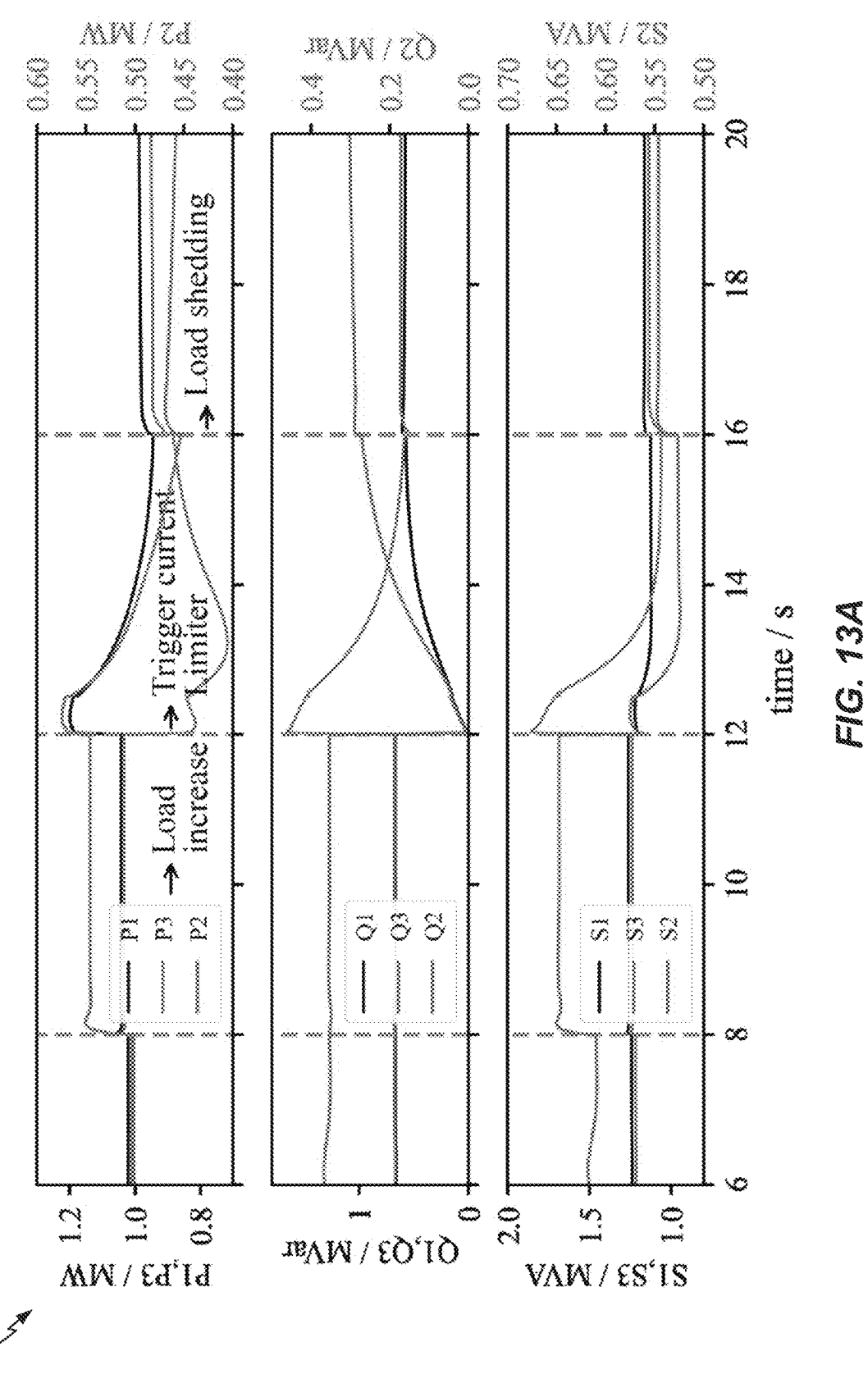
FIG. 13A depicts an example dynamic inverter output and performance of a current limiter in example Scenario Two-One.
Figure 13B:
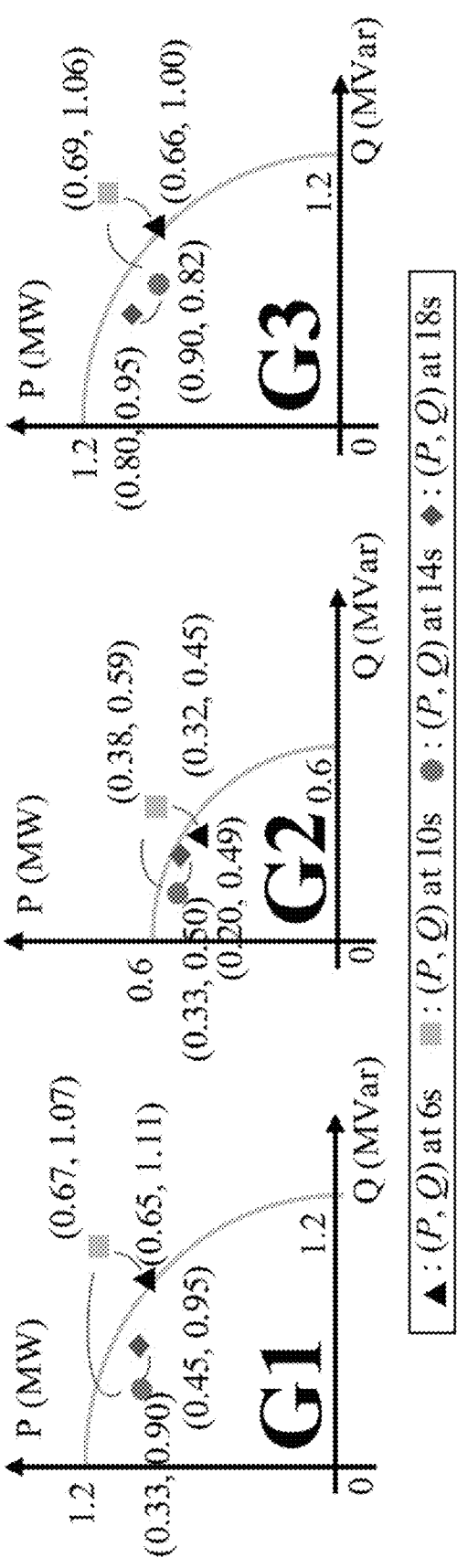
FIG. 13B depicts an example static inverter output and performance of the current limiter in example Scenario Two-One.
Figure 13C:
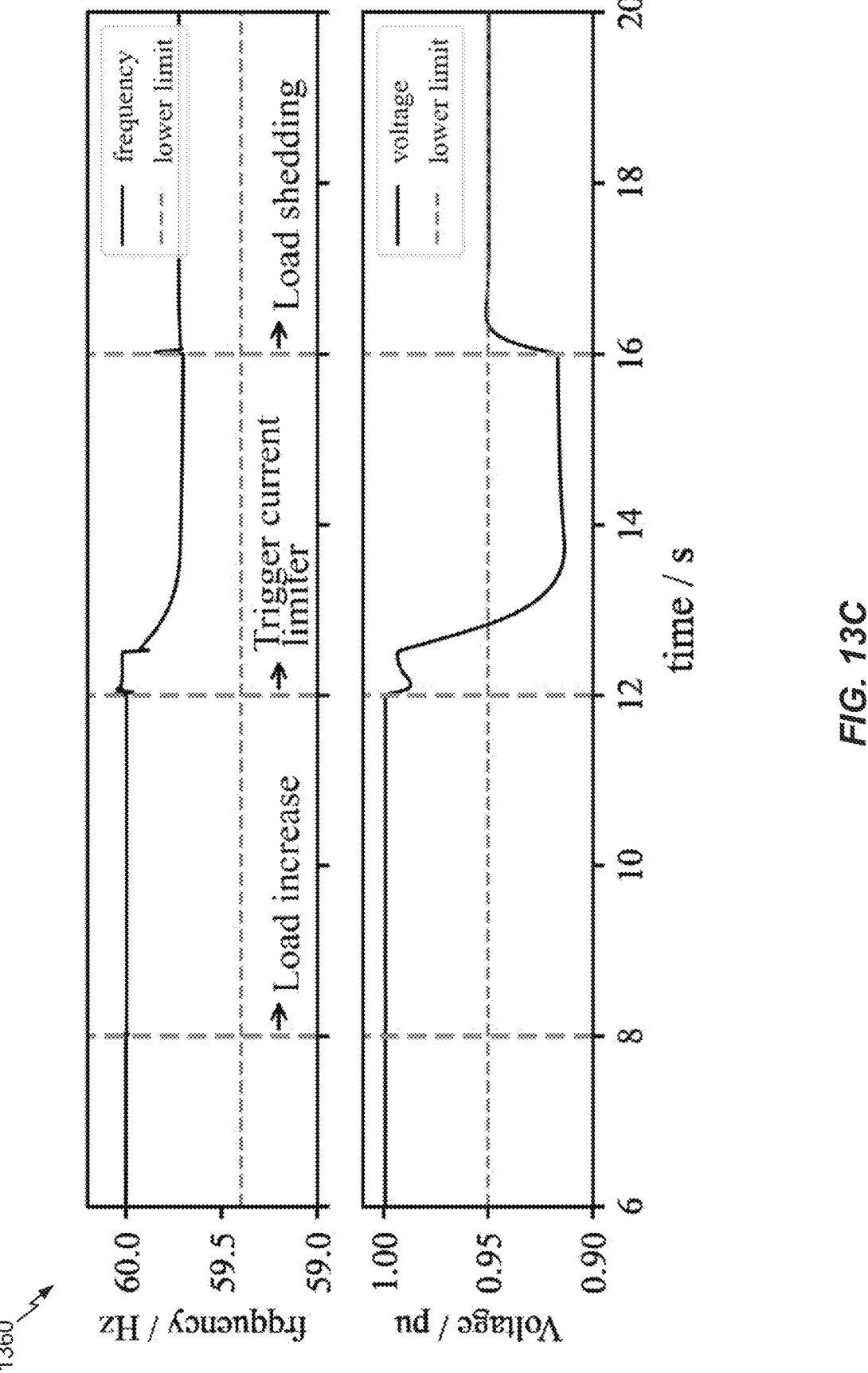
FIG. 13C depicts an example dynamic frequency and voltage, and performance of the current limiter in example Scenario Two-One.
Figure 14A:
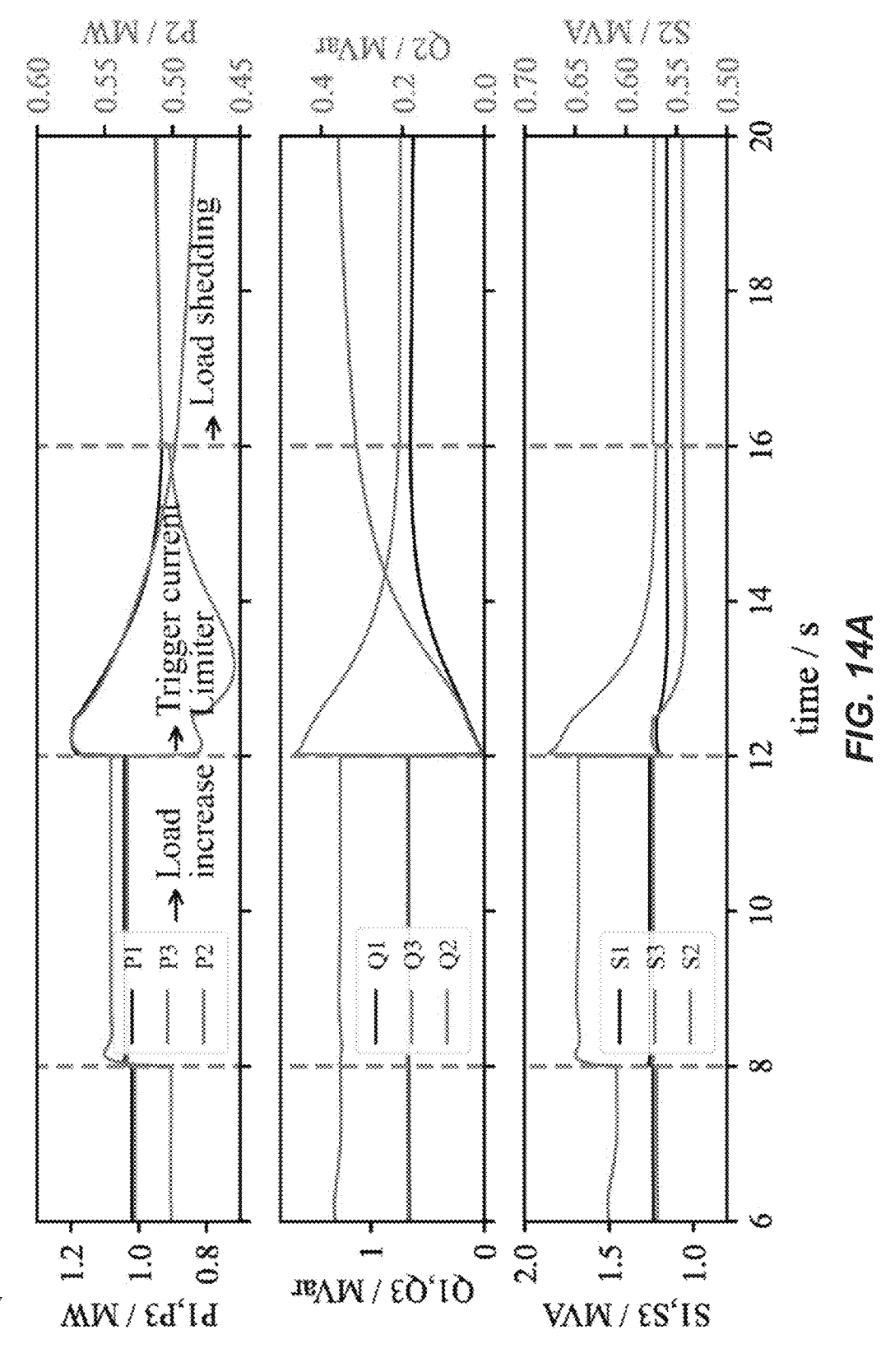
FIG. 14A depicts an example dynamic inverter output and performance of a current limiter in example Scenario Two-Two.
Figure 14B:
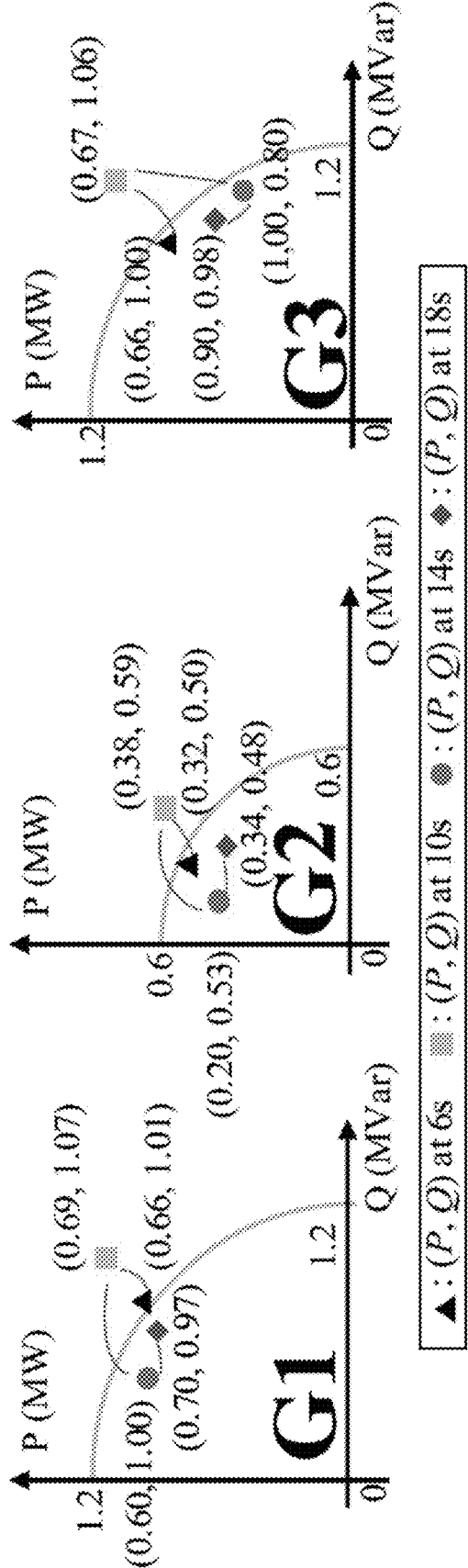
FIG. 14B depicts an example static inverter output and performance of the current limiter in example Scenario Two-Two.
Figure 14C:
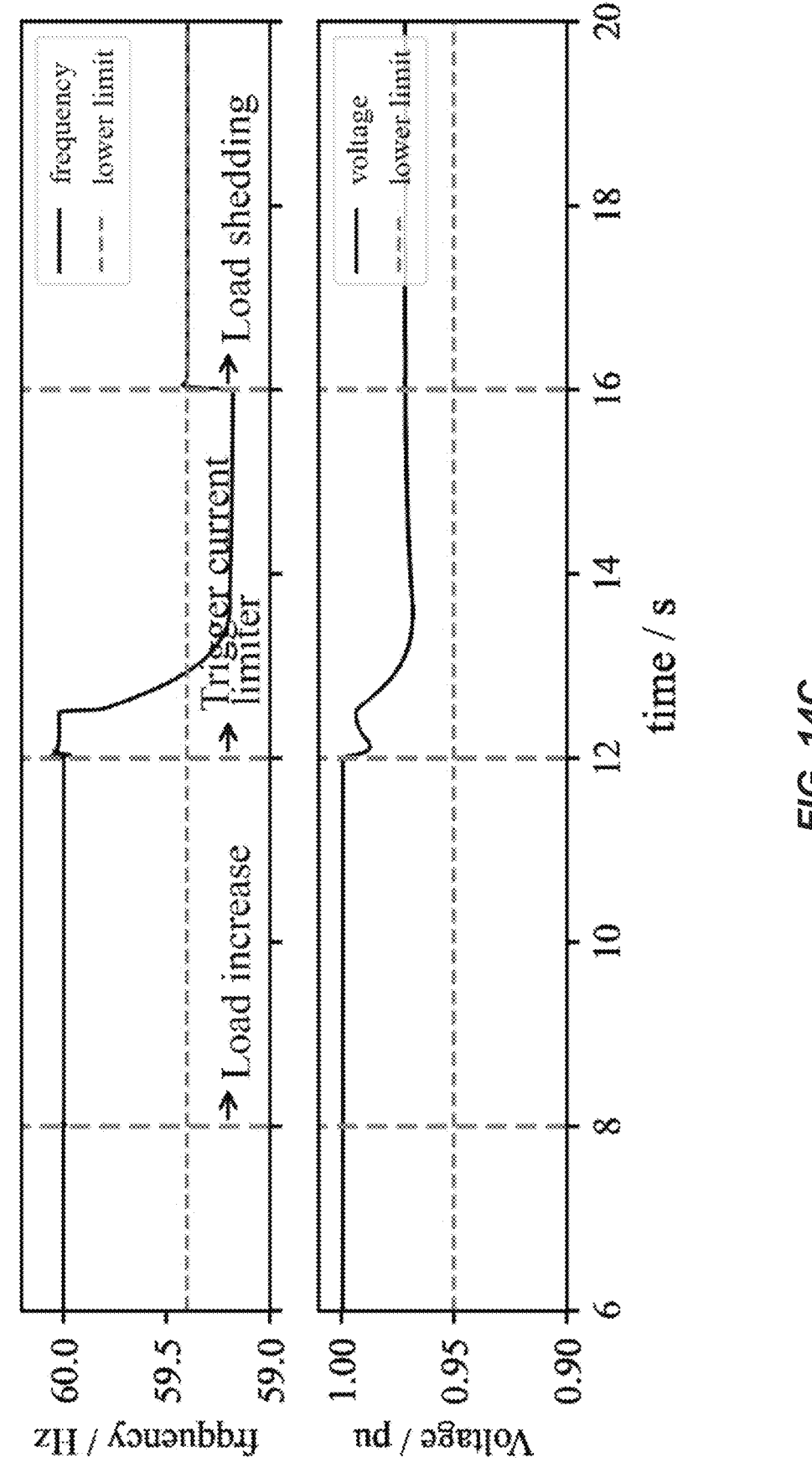
FIG. 14C depicts an example frequency and voltage, and performance of the current limiter in example Scenario Two-Two.

Like the comparisons in Scenario 1, the threshold of the current limiter can be adaptively updated according to the real-time DER capacity, and active power priority can be implemented. Triggering three current limiters simultaneously in Scenario 2 can result in instability. Hence, in non-limiting examples, the current limiter of G3 can be triggered 0.5 s later than those of G1 and G2. In addition, the threshold for G3 can be gradually decreased. The comparison results of Scenario 2-1 is shown in FIGS. 13A, 13B, and 13C. The comparison results of Scenario 2-2 is shown in FIGS. 14A, 14B, and 14C.

FIG. 13A depicts an example dynamic inverter output and performance of a current limiter 1300 in example Scenario Two-One.

FIG. 13B depicts an example static inverter output and performance of the current limiter 1330 in example Scenario Two-One.

FIG. 13C depicts an example dynamic frequency and voltage, and performance of the current limiter 1360 in example Scenario Two-One.

FIG. 14A depicts an example dynamic inverter output and performance of a current limiter 1400 in example Scenario Two-Two.

FIG. 14B depicts an example static inverter output and performance of the current limiter 1430 in example Scenario Two-Two.

FIG. 14C depicts an example frequency and voltage, and performance of the current limiter 1460 in example Scenario Two-Two.

Based on the comparisons, there are the following observations:

First, the current limiter causes large P-Q and V-f deviations at 8 s, while the provided method has a smoother state transition due to the implementation of a PI controller.

Second, the capacity constraints of the current limiter were not accurate due to the voltage deviation. Scenario 2-1 has a large voltage dip in FIG. 13C, and the inverter generation were inside the capacity circle at 14 s, as shown in FIG. 13B.

Third, the current limiter failed to reallocate the constrained generation capacity. Hence, to recover voltage and frequency, load shedding is required after 16 s.

In Scenario 2-1, an additional counterintuitive observation is the output of the inverters increased following load shedding. After load shedding, the grid voltage increased, and since the current was constrained by the limiter, the actual output increased.

In general, Scenarios 2-1 and 2-2 verify the provided decentralized and coordinated control framework. The framework enables output control of GFM inverters and V-f improvement under the condition of constrained DER capacity and outperforms the current limiter.

Provided is a decentralized and coordinated V-f control framework to address the challenges brought by DER inadequacy in islanded microgrids. The control framework can include a power regulator and a V-f regulator. The power regulator can regulate the output of GFM inverters without violating real-time reference capacities, while the V-f regulator improves the V-f deviation by leveraging the load response to voltage and frequency. The control framework can be developed based on droop control and can be purely decentralized and not dependent on costly communication interfaces. In addition, it can provide DC voltage stability and can reduce involuntary load shedding. Within the provided control framework, three-level coordination can be achieved simultaneously when DERs are inadequate, that can include (i) generation and load, (ii) V regulation and f regulation, and (iii) P generation and Q generation. In examples, provided is V-f control at a primary level for a balanced microgrid.

Figure 15:
FIG. 15 depicts a block diagram of an example computing device suitable for implementing examples of the disclosed subject matter.
Figure 15:
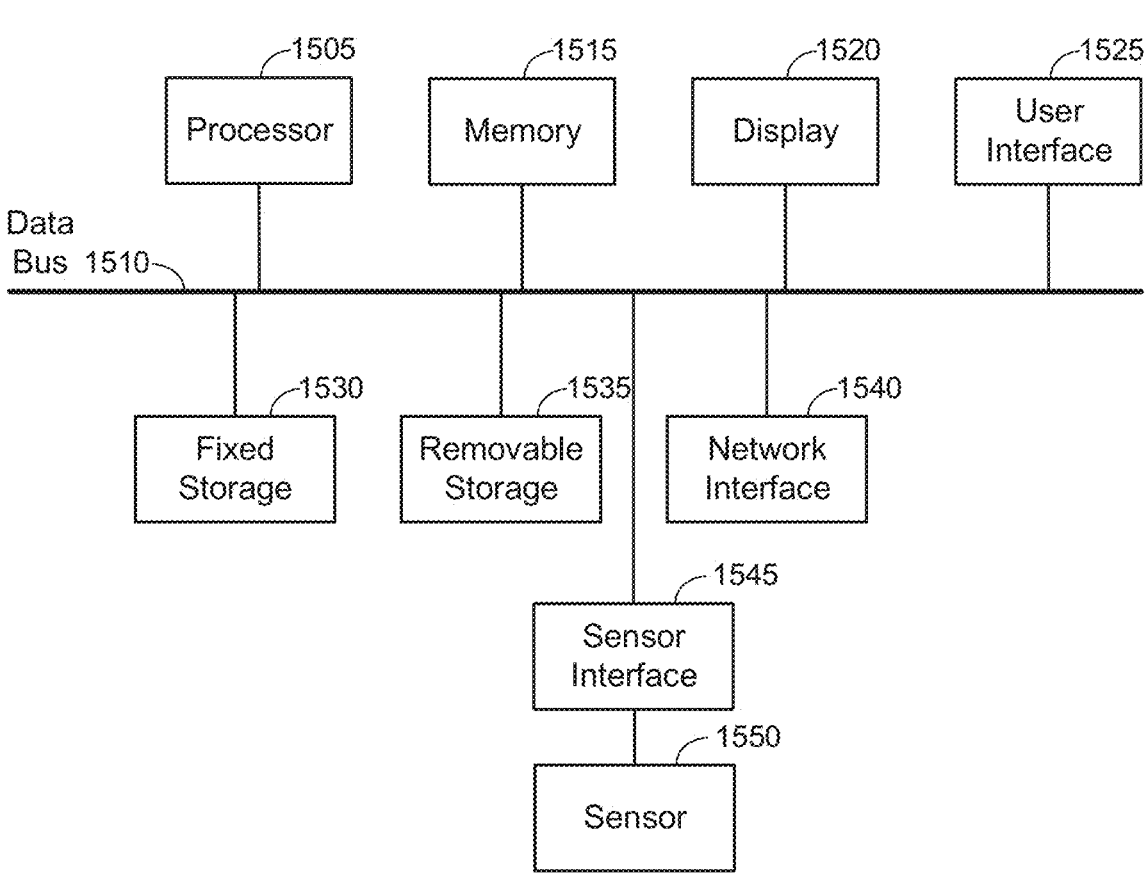

FIG. 15 depicts a block diagram of an example computing device 1500 suitable for implementing examples of the disclosed subject matter. For example, at least a portion of the computing device 1500 can be suitable for use as a component part of a DER power supply, a power grid controller, an inverter, a primary regulator, or both. In in example, at least a portion of the computing device 1500 can be coupled to an inverter.

In examples, aspects of the computing device 1500 can be implemented at least in part in a desktop computer, a laptop computer, a server, a mobile device, a special-purpose computer, a non-generic computer, an electronic device described hereby (as is practicable), the like, or a combination thereof. In some examples, the disclosed subject matter can be implemented in, and used with, hardware devices, computer network devices, the like, or a combination thereof. The configuration depicted in FIG. 15 is an illustrative example and is not limiting.

In some examples, the computing device 1500 can include a processor 1505, a data bus 1510, a memory 1515, a display 1520, a user interface 1525, a fixed storage device 1530, a removable storage device 1535, a network interface 1540, a sensor interface 1545, a sensor 1550, the like, or a combination thereof. These elements are described in further detail herein.

The processor 1505 can be a hardware-implemented processing unit configured to control at least a portion of operation of the computing device 1500. The processor 1505 can perform logical and arithmetic operations based on processor-executable instructions stored within the memory 1515. The processor 1505 can be configured to execute instructions which cause the processor 1505 to initiate at least a part of a method described hereby. In an example, the processor 1505 can interpret instructions stored in the memory 1515 to initiate at least a part of a method described hereby. In an example, the processor 1505 can execute instructions stored in the memory 1515 to initiate at least a part of a method described hereby. The instructions, when executed by the processor 1505, can transform the processor 1505 into a special-purpose processor that causes the processor to perform at least a part of a function described hereby. The processor 1505 may also be referred to as a central processing unit (CPU), a special-purpose processor (e.g., a non-generic processor), or both.

In some examples, the computing device 1500 can implement at least a portion of a technique described hereby to collect information, process information, or both. In some examples, information stored in an information storage device of the computing device 1500 can be transferred to another computing device 1500 (or other type of computing device).

The processor 1505 can comprise or be a component of a physical processing system implemented with one or more processors. In some examples, the processor 1505 can be implemented with at least a portion of: a microprocessor, a microcontroller, a digital signal processor (DSP) integrated circuit, a field programmable gate array (FPGA), a programmable logic device (PLD), an application-specific integrated circuit (ASIC), a controller, a state machine, a gated logic circuit, a discrete hardware component, a dedicated hardware finite state machine, a suitable physical device configured to manipulate information (e.g., calculating, logical operations, the like, or a combination thereof), the like, or a combination thereof.

The data bus 1510 can couple components of the computing device 1500. The data bus 1510 can enable information communication between the processor 1505 and one or more components coupled to the processor 1505. In some examples, the data bus 1510 can include a data bus, a power bus, a control signal bus, a status signal bus, the like, or a combination thereof. In an example, the components of the computing device 1500 can be coupled together to communicate with each other using a different suitable mechanism.

The memory 1515 generally represents any type or form of volatile storage device, non-volatile storage device, medium, the like, or a combination thereof. The memory 1515 can store data, processor-readable instructions, the like, or a combination thereof. In an example, the memory 1515 can store data, load data, maintain data, or a combination thereof. In an example, the memory 1515 can store processor-readable instructions, load processor-readable instructions, maintain processor-readable instructions, or a combination thereof. In some embodiments, the memory 1515 can store computer-readable instructions configured to cause a processor (e.g., the processor 1505) to initiate performing at least a portion of a method described hereby. The memory 1515 can be a main memory configured to store an operating system, an application program, the like, or a combination thereof. The memory 1515 can store a basic input-output system (BIOS) which can control basic hardware operation such as interaction of the processor 1505 with peripheral components. The memory 1515 can also include a non-transitory machine-readable medium configured to store software. Software can mean any type of instructions, whether referred to as at least one of software, firmware, middleware, microcode, hardware description language, the like, or a combination thereof. Processor-readable instructions can include code (e.g., in source code format, in binary code format, executable code format, or in any other suitable code format).

The memory 1515 can include at least one of read-only memory (ROM), random access memory (RAM), a flash memory, a cache memory, an erasable programmable read-only memory (EPROM), an electrically erasable programmable read-only memory (EEPROM), a register, a hard disk drive (HDD), a solid-state drive (SSD), an optical disk drive, other memory, the like, or a combination thereof that is configured to store information (e.g., data, processor-readable instructions, software, the like, or a combination thereof) and is configured to provide the information to the processor 1505.

The display 1520 can include a component configured to visually convey information to a user of the computing device 1500. In examples, the display 1520 can be a video display screen, such as a light-emitting diode (LED) screen, a touch screen, or both.

The user interface 1525 can include user devices such as a switch, a keypad, a touch screen, a microphone, a speaker, an audio production device, a jack for coupling the computing device to an audio production device, the like, or a combination thereof. The user interface 1525 can optionally include a user interface controller. The user interface 1525 can include a component configured to convey information to a user of the computing device 1500, a component configured to receive information from the user of the computing device 1500, or both.

The fixed storage device 1530 can include one or more hard drive, flash storage device, the like, or a combination thereof. The fixed storage device 1530 can be an information storage device that is not configured to be removed during use. The fixed storage device 1530 can optionally include a fixed storage device controller. The fixed storage device 1530 can be integral with the computing device 1500 or can be separate and accessed through an interface.

The removable storage device 1535 can be integrated with the computing device 1500 or can be separate and accessed through other interfaces. The removable storage device 1535 can be an information storage device that is configured to be removed during use, such as a memory card, a jump drive, a flash storage device, an optical disk, the like, or a combination thereof. The removable storage device 1535 can optionally include a removable storage device controller. The removable storage device 1535 can be integrated with the computing device 1500 or can be separate and accessed through an interface.

In examples, a computer-readable storage medium such as one or more of the memory 1515, the fixed storage device 1530, the removable storage device 1535, a remote storage location, the like, or a combination thereof can store non-transitory computer-executable instructions configured to cause a processor (e.g., the processor 1505) to implement at least an aspect of a technique described hereby.

The network interface 1540 can couple the processor 1505 (e.g., via the data bus 1510) to a network and enable exchanging information between the processor 1505 and the network. In some examples, the network interface 1540 can couple the processor 1505 (e.g., via the data bus 1510) to the network and enable exchanging information between the processor 1505 and the sensor 1550. For example, the network interface 1540 can enable the processor 1505 to communicate with one or more other network devices. The network interface 1540 can couple to the network using any suitable technique and any suitable protocol. In some examples, the network interface 1540 can include a data bus, a power bus, a control signal bus, a status signal bus, the like, or a combination thereof. Example techniques and protocols the network interface 1540 can be configured to implement include digital cellular telephone, WiFi™, Bluetooth®, near-field communications (NFC), the like, or a combination thereof.

The network can couple the processor 1505 to one or more other network devices. In some examples, the network can enable exchange of information between the processor 1505 and the one or more other network devices. In some examples, the network can enable exchange of information between the processor 1505 and the sensor 1550. The network can include one or more private networks, local networks, wide-area networks, the Internet, other communication networks, the like, or a combination thereof. In some examples, the network can be a wired network, a wireless network, an optical network, the like, or a combination thereof.

In some embodiments, the network device can store computer-readable instructions configured to cause a processor (e.g., the processor 1505) to initiate performing at least a portion of a technique described hereby. In an example, the one or more other network devices can store non-transitory computer-executable instructions configured to cause a processor (e.g., the processor 1505) to implement at least an aspect of the present disclosure. The non-transitory computer-executable instructions can be received by the processor 1505 and implemented using at least a portion of a technique described hereby. In another example, information described hereby can be stored in the fixed storage device 1530, the removable storage device 1535, the network device, the like, or a combination thereof.

The network device can include the sensor 1550, a hardware device configured to couple the network to the sensor 1550, a server, a digital information storage device, the like, or a combination thereof.

In some examples, the network device can include user devices such as a switch, a keypad, a touch screen, a microphone, a speaker, an audio reproduction device, a jack for coupling the computing device to an audio reproduction device, the like, or a combination thereof. The network device can optionally include a user interface controller. The network device can include a component configured to convey information to a user of the computing device 1500, a component configured to receive information from the user of the computing device 1500, or both.

The sensor interface 1545 can couple the processor 1505 (e.g., via the data bus 1510) to the sensor 1550. In some examples, the sensor interface 1545 can couple the processor 1505 (e.g., via the data bus 1510) to the sensor 1550 and enable exchanging information between the processor 1505 and the sensor 1550. For example, the sensor interface 1545 can enable the processor 1505 to receive, from the sensor 1550, analog information and/or digital information describing at least one characteristic of at least a portion of a human body. The sensor interface 1545 can couple to the sensor 1550 using any suitable technique and any suitable protocol. In some examples, the sensor interface 1545 can perform analog-to-digital conversion, digital-to-analog conversion, or a combination thereof. In some examples, the sensor interface 1545 can include a data bus, a power bus, a control signal bus, a status signal bus, the like, or a combination thereof. Example techniques and protocols the sensor interface 1545 can be configured to implement include digital cellular telephone, WiFi™, Bluetooth®, near-field communications (NFC), the like, or a combination thereof.

The sensor 1550 can sense a characteristic of at least a portion of a power supply. In examples, the sensor 1550 can produce an analog output indicating the at least one state, a digital output indicating the at least one state, or both. The sensor 1550 can produce an output of the at least one state using any suitable technique, any suitable protocol, or both. In some examples, the sensor 1550 can perform analog-to-digital conversion, digital-to-analog conversion, or a combination thereof. In some examples, the sensor 1550 can include a data bus, a power bus, a control signal bus, a status signal bus, the like, or a combination thereof. Example techniques and protocols the sensor 1550 can be configured to implement include digital cellular telephone, WiFi™, Bluetooth®, near-field communications (NFC), the like, or a combination thereof.

In examples, the sensor 1550 can include a power sensor, a voltage sensor, a current sensor, a resistance sensor, an inductance sensor, capacitance sensor, a power factor sensor, a temperature sensor, an inverter status sensor, a load status sensor, a power supply status sensor, a circuit breaker status sensor, a sensor described hereby, a sensor configured to produce computer-processable data described hereby, or a combination thereof.

In some examples, all the components illustrated in FIG. 15 need not be present to practice the present disclosure. Further, the components can be coupled in different ways from those illustrated.

FIG. 16 depicts a block diagram of an example method for controlling an inverter 1600 suitable for implementing examples of the disclosed subject matter. The method 1600 can be performed at least in part by the apparatus described hereby, such as a controller, the computing device 1500 in FIG. 15, or a practicable combination thereof. Additional aspects of the provided example methods are described hereby. At least a portion of these additional aspects can be integrated with the method 1600. The steps shown in FIG. 16 can be performed by any suitable computer-executable code, computing system, or a combination thereof. In some examples, each of the steps shown in FIG. 16 can represent an algorithm whose structure includes multiple substeps, is represented by multiple substeps, or a combination thereof, examples of which are provided in greater detail hereby.

As depicted in FIG. 16, at step 1605, one or more of the devices described herein can detect an inverter output overload condition by comparing a measured output power to a reference power capacity. In an example, the detecting can be performed by using a power regulator.

In an example, the inverter can be a grid-forming inverter (GFM) connected to a DER system. The inverter can be configured to convert direct current to alternating current and to power a AC load.

In an embodiment, the detecting the inverter output overload condition can further include detecting, in an absence of a change of the inverter control input, a decrease in the inverter output voltage (e.g. AC output voltage), a decrease in the inverter output frequency, or both.

As depicted in FIG. 16, at step 1610, one or more of the devices described herein can create an inverter control input configured to change an inverter output frequency, an inverter output voltage, or both, in response to the overload condition. The converter control input can be configured to restore a combination of a real output power of the inverter and a reactive output power of the inverter to within a combined maximum static output power limit. An example, inverter control input can be created by using the power regulator.

In an example, the creating the inverter control input can further include calculating, when the real-time reference capacity is equal to or less than the measured output power, a supply error by subtracting the measured output power from the real-time reference capacity.

As depicted in FIG. 16, at step 1615, one or more of the devices described herein can adjust, using the converter control input, the inverter to mitigate the inverter output overload condition.

As depicted in FIG. 16, at step 1620, one or more of the devices described herein can detect a droop condition. The droop condition can include the inverter output voltage being out of band, the inverter output frequency being out of band, or both. The devices described herein can detect the droop condition. For example, the voltage-frequency regulator can detect the droop condition. In a nonlimiting example, the droop condition can be detected after the adjusting the inverter output to mitigate the inverter output overload condition.

As depicted in FIG. 16, at step 1625, one or more of the devices described herein can modify the inverter control input to change the inverter output voltage, the inverter output frequency, or both, in order to mitigate the droop condition. The inverter control input can be changed in a manner such that the inverter output voltage, the inverter output frequency, or both are changed to mitigate the droop condition while maintaining the combination of the real output power of the inverter and the reactive output power of the inverter within the combined maximum static output power limit using the voltage-frequency regulator.

In an embodiment, the modifying the inverter control input can further include calculating frequency error, calculating a voltage error, or both. The calculating the frequency error can include (i) calculating a differential frequency by subtracting the inverter output frequency from a reference output frequency, and (ii) comparing the differential frequency to a maximum differential output frequency. The calculating the voltage error can include (i) calculating a differential voltage by subtracting the inverter output voltage from a reference output voltage, and (ii) comparing the differential voltage to a maximum differential output voltage. The frequency error, the voltage error, or both can be applied to respective proportional integral controllers. The output of the respective proportional integral controllers can be used to modify the inverter control input (e.g. the inverter control input created at step 1610, a pre-existing inverter control input, or both).

In an embodiment, the method can further include applying the frequency error, the voltage error, or both to trigger logic. The trigger logic can be configured to trigger power quality regulation when the inverter output voltage is out of band, the inverter output frequency is out of band, or both. In an example, the trigger logic can be used to trigger load shedding when the inverter output voltage is out of band, the inverter output frequency is out of band, or both. In an example, the trigger logic can be used to trigger load shedding when both the inverter output voltage is out of band and the inverter output frequency is out of band, simultaneously.

As depicted in FIG. 16, at step 1630, one or more of the devices described herein can adjust, using the modified inverter control input, the inverter to mitigate the droop condition.

As used hereby, the term "example" means "serving as an example, instance, or illustration." Any example described as an "example" is not necessarily to be construed as preferred or advantageous over other examples. Likewise, the term "examples" does not require all examples include the provided feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described hereby can be represented using any of a variety of different technologies and techniques. For example, data, an instruction, a process step, a process block, a command, information, a signal, a bit, a symbol, and the like which are referred to hereby can be represented by a voltage, a current, an electromagnetic wave, a magnetic field, a magnetic particle, an optical field, an optical particle, and/or any practical combination thereof, depending at least in part on the particular application, at least in part on the desired design, at least in part on the corresponding technology, and/or at least in part on like factors.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements". For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In other words, the singular portends the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

Those of skill in the art will appreciate the example logical blocks, elements, modules, circuits, and steps described in the examples disclosed hereby can be implemented individually and/or collectively, as electronic hardware, computer software, or combinations of both, as practicable. To clearly illustrate this interchangeability of hardware and software, example components, blocks, elements, modules, circuits, and steps have been described hereby generally in terms of their functionality. Whether such functionality is implemented as hardware or software depends upon the particular application and design constraints imposed on an overall system. Skilled artisans can implement the described functionality in different ways for each particular application, but such implementation decisions should not be interpreted as causing a departure from the scope of the present disclosure. In addition, any disclosure of components contained within other components should be considered example in nature since many other architectures can be implemented to achieve the same functionality.

At least a portion of the methods, sequences, algorithms or a combination thereof which are described in connection with the examples disclosed hereby can be embodied directly in hardware, in instructions executed by a processor (e.g., a processor described hereby), or in a combination thereof. In an example, a processor includes multiple discrete hardware components. Instructions can reside in a non-transient storage medium (e.g., a memory device), such as a random-access memory (RAM), a flash memory, a read-only memory (ROM), an erasable programmable read-only memory (EPROM), an electrically erasable programmable read-only memory (EEPROM), a register, a hard disk, a removable disk, a compact disc read-only memory (CD-ROM), any other form of storage medium, the like, or a combination thereof. An example storage medium (e.g., a memory device) can be coupled to the processor so the processor can read information from the storage medium, write information to the storage medium, or both. In an example, the storage medium can be integral with the processor.

Further, examples provided hereby are described in terms of sequences of actions to be performed by, for example, one or more elements of a computing device. The actions described hereby can be performed by a specific circuit (e.g., an application specific integrated circuit (ASIC)), by instructions being executed by one or more processors, or by a combination of both. Additionally, a sequence of actions described hereby can be entirely within any form of non-transitory computer-readable storage medium having stored thereby a corresponding set of computer instructions which, upon execution, cause an associated processor (such as a special-purpose processor) to perform at least a portion of a function described hereby. Additionally, a sequence of actions described hereby can be entirely within any form of non-transitory computer-readable storage medium having stored thereby a corresponding set of instructions which, upon execution, configure the processor to create specific logic circuits. Thus, examples may be in a number of different forms, all of which have been contemplated to be within the scope of the disclosure. In addition, for each of the examples described hereby, a corresponding electrical circuit of any such examples may be described hereby as, for example, "a logic circuit configured to" perform a described action.

In an example, when a general-purpose computer (e.g., a processor) is configured to perform at least a portion of a method described hereby, then the general-purpose computer becomes a special-purpose computer which is not generic and is not a general-purpose computer. In an example, loading a general-purpose computer with special programming can cause the general-purpose computer to be configured to perform at least a portion of a method described hereby. In an example, a combination of two or more related method steps disclosed hereby forms a sufficient algorithm. In an example, a sufficient algorithm constitutes special programming. In an example, special programming constitutes any software which can cause a computer (e.g., a general-purpose computer, a special-purpose computer, etc.) to be configured to perform one or more functions, features, steps algorithms, blocks, or a combination thereof, as disclosed hereby.

At least one example provided hereby can include a non-transitory (i.e., a non-transient) machine-readable medium and/or a non-transitory (i.e., a non-transient) computer-readable medium storing processor-executable instructions configured to cause a processor (e.g., a special-purpose processor) to transform the processor and any other cooperating devices into a machine (e.g., a special-purpose processor) configured to perform at least a part of a function described hereby, at least a part of a method described hereby, the like, or a combination thereof. Performing at least a part of a function described hereby can include initiating at least a part of a function described hereby, at least a part of a method described hereby, the like, or a combination thereof. In an example, execution of the stored instructions can transform a processor and any other cooperating devices into at least a part of an apparatus described hereby. A non-transitory (i.e., a non-transient) machine-readable medium specifically excludes a transitory propagating signal. Further, one or more examples can include a computer-readable medium embodying at least a part of a function described hereby, at least a part of a method described hereby, the like, or a combination thereof.

Nothing stated or depicted in this application is intended to dedicate any component, step, block, element, feature, object, benefit, advantage, or equivalent to the public, regardless of whether the component, step, block, element, feature, object, benefit, advantage, or the equivalent is recited in the claims. While this disclosure describes examples, changes and modifications can be made to the examples disclosed hereby without departing from the scope defined by the appended claims. A feature from any of the provided examples can be used in combination with one another feature from any of the provided examples in accordance with the general principles described hereby. The present disclosure is not intended to be limited to the specifically disclosed examples alone.

Features from any of the embodiments described herein may be used in combination with another embodiment in accordance with the general principles described herein. These and other embodiments, features, and advantages will be more fully understood upon reading this detailed description in conjunction with the accompanying drawings and claims.

What is claimed is:

1. A method for controlling an inverter, comprising:

detecting, using a power regulator, an inverter output overload condition by comparing a measured output power to a reference power capacity;

creating, using the power regulator, an inverter control input configured to change an inverter output frequency, an inverter output voltage, or both, in response to the overload condition, wherein:

the inverter control input is configured to restore a combination of a real output power of the inverter and a reactive output power of the inverter to within a combined maximum static output power limit; and the creating the inverter control input comprises calculating, when a real-time reference capacity is equal to or less than the measured output power, a supply error by subtracting the measured output power from the real-time reference capacity;

adjusting, using the inverter control input, the inverter to mitigate the inverter output overload condition;

detecting, using a voltage-frequency regulator and after the adjusting the inverter output to mitigate the inverter output overload condition, a droop condition comprising at least one of:

the inverter output voltage being out of band; or the inverter output frequency being out of band;

modifying, using the voltage-frequency regulator, the inverter control input to change the inverter output voltage, the inverter output frequency, or both to mitigate the droop condition while maintaining the combination of the real output power of the inverter and the reactive output power of the inverter within the combined maximum static output power limit; and adjusting, using the modified inverter control input, the inverter to mitigate the droop condition.

2. The method of claim 1, wherein the inverter is a grid-forming inverter connected to a distributed energy resource system.

3. The method of claim 1, wherein the detecting the inverter output overload condition further comprises detecting, in an absence of a change of the inverter control input:

a decrease in the inverter output voltage;

a decrease in the inverter output frequency; or both.

4. The method of claim 1, wherein the modifying the inverter control input further comprises:

calculating a frequency error by:

calculating a differential frequency by subtracting the inverter output frequency from a reference output frequency; and comparing the differential frequency to a maximum differential output frequency;

calculating a voltage error by:

calculating a differential voltage by subtracting the inverter output voltage from a reference output voltage; and comparing the differential voltage to a maximum differential output voltage;

applying the frequency error and the voltage error to respective proportional integral controllers; and using the output of the respective proportional integral controllers to modify the inverter control input.

5. The method of claim 4, further comprising applying the frequency error and the voltage error to trigger logic, wherein the trigger logic that is configured to trigger power quality regulation when either:

the inverter output voltage is out of band; or the inverter output frequency is out of band.

6. The method of claim 1, further comprising triggering load shedding when both the inverter output voltage is out of band and the inverter output frequency is out of band simultaneously.

7. An inverter control system, comprising:

a power regulator configured to:

detect an inverter output overload condition by comparing a measured output power to a reference power capacity;

create an inverter control input configured to change an inverter output frequency, an inverter output voltage, or both, in response to the overload condition, wherein:

the inverter control input is configured to restore a combination of a real output power of the inverter and a reactive output power of the inverter to within a combined maximum static output power limit; and the creating the inverter control input comprises calculating, when a real-time reference capacity is equal to or less than the measured output power, a supply error by subtracting the measured output power from the real-time reference capacity; and adjust, using the inverter control input, an inverter to mitigate the inverter output overload condition; and a voltage-frequency regulator configured to:

detect, after the adjusting the inverter output to mitigate the inverter output overload condition, a droop condition comprising at least one of:

the inverter output voltage being out of band; or the inverter output frequency being out of band;

modify the inverter control input to change the inverter output voltage, the inverter output frequency, or both to mitigate the droop condition while maintaining the combination of the real output power of the inverter and the reactive output power of the inverter within the combined maximum static output power limit; and adjust, using the modified inverter control input, the inverter to mitigate the droop condition.

8. The inverter control system of claim 7, further comprising the inverter, wherein the inverter is a grid-forming inverter connected to a distributed energy resource system.

9. The inverter control system of claim 7, wherein the detecting the inverter output overload condition further comprises detecting, in an absence of a change of the inverter control input:

a decrease in the inverter output voltage;

a decrease in the inverter output frequency; or both.

10. The inverter control system of claim 7, wherein the modifying the inverter control input further comprises:

calculating a frequency error by:

calculating a differential frequency by subtracting the inverter output frequency from a reference output frequency; and comparing the differential frequency to a maximum differential output frequency;

calculating a voltage error by:

calculating a differential voltage by subtracting the inverter output voltage from a reference output voltage; and comparing the differential voltage to a maximum differential output voltage;

applying the frequency error and the voltage error to respective proportional integral controllers; and using the output of the respective proportional integral controllers to modify the inverter control input.

11. The inverter control system of claim 10, wherein the voltage-frequency regulator is further configured to apply the frequency error and the voltage error to trigger logic that is configured to trigger power quality regulation when either:

the inverter output voltage is out of band; or the inverter output frequency is out of band.

12. The inverter control system of claim 7, wherein the voltage-frequency regulator is further configured to trigger load shedding when both the inverter output voltage is out of band and the inverter output frequency is out of band simultaneously.

13. A non-transitory computer-readable medium storing one or more computer-executable instructions that, when executed by at least one processor of a computing device, cause the computing device to perform a method for controlling an inverter, wherein the method comprises:

detecting, using a power regulator, an inverter output overload condition by comparing a measured output power to a reference power capacity;

creating, using the power regulator, an inverter control input configured to change an inverter output frequency, an inverter output voltage, or both, in response to the overload condition, wherein:

the inverter control input is configured to restore a combination of a real output power of the inverter and a reactive output power of the inverter to within a combined maximum static output power limit; and the creating the inverter control input comprises calculating, when a real-time reference capacity is equal to or less than the measured output power, a supply error by subtracting the measured output power from the real-time reference capacity;

adjusting, using the inverter control input, the inverter to mitigate the inverter output overload condition;

detecting, using a voltage-frequency regulator and after the adjusting the inverter output to mitigate the inverter output overload condition, a droop condition comprising at least one of:

the inverter output voltage being out of band; or the inverter output frequency being out of band;

modifying, using the voltage-frequency regulator, the inverter control input to change the inverter output voltage, the inverter output frequency, or both to mitigate the droop condition while maintaining the combination of the real output power of the inverter and the reactive output power of the inverter within the combined maximum static output power limit; and adjusting, using the modified inverter control input, the inverter to mitigate the droop condition.

14. The non-transitory computer-readable medium of claim 13, wherein the inverter is a grid-forming inverter connected to a distributed energy resource system.

15. The non-transitory computer-readable medium of claim 13, wherein the detecting the inverter output overload condition further comprises detecting, in an absence of a change of the inverter control input:

a decrease in the inverter output voltage;

a decrease in the inverter output frequency; or both.

16. The non-transitory computer-readable medium of claim 13, wherein the modifying the inverter control input further comprises:

calculating a frequency error by:

calculating a differential frequency by subtracting the inverter output frequency from a reference output frequency; and comparing the differential frequency to a maximum differential output frequency;

calculating a voltage error by:

calculating a differential voltage by subtracting the inverter output voltage from a reference output voltage; and comparing the differential voltage to a maximum differential output voltage;

applying the frequency error and the voltage error to respective proportional integral controllers; and using the output of the respective proportional integral controllers to modify the inverter control input.

17. The non-transitory computer-readable medium of claim 16, wherein the method further comprises applying the frequency error and the voltage error to trigger logic, that is configured to trigger power quality regulation when either:

the inverter output voltage is out of band; or the inverter output frequency is out of band.

18. The non-transitory computer-readable medium of claim 13, wherein the method further comprises triggering load shedding when both the inverter output voltage is out of band and the inverter output frequency is out of band simultaneously.

\*    \*    \*    \*    \*